US011558090B2

(12) United States Patent
Files et al.

(10) Patent No.: US 11,558,090 B2
(45) Date of Patent: Jan. 17, 2023

(54) SYSTEMS AND METHODS TO UTILIZE CONTEXTUAL AWARENESS AND MACHINE LEARNING TO OPTIMIZE ANTENNA SELECTION

(71) Applicant: Dell Products, LP, Round Rock, TX (US)

(72) Inventors: Jace W. Files, Round Rock, TX (US); Liam B. Quinn, Austin, TX (US); Abu S. Sanaullah, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/075,483

(22) Filed: Oct. 20, 2020

(65) Prior Publication Data
US 2022/0123797 A1  Apr. 21, 2022

(51) Int. Cl.
*H04B 7/0456* (2017.01)
*H04B 17/309* (2015.01)
*H04W 76/10* (2018.01)

(52) U.S. Cl.
CPC ......... *H04B 7/0456* (2013.01); *H04B 17/309* (2015.01); *H04W 76/10* (2018.02)

(58) Field of Classification Search
CPC ............ H01Q 1/22; H01Q 1/24; H01Q 1/243; H01Q 1/245; H01Q 3/24; H01Q 21/00; H01Q 25/04; H04B 1/12; H04B 1/401; H04B 1/3838; H04B 7/00; H04B 7/06; H04B 7/0413; H04B 7/0456; H04B 17/00; H04B 17/309; H04L 5/00; H04L 12/26; H04L 25/02; H04L 29/06; H04W 4/00; H04W 24/02; H04W 24/08; H04W 24/10; H04W 52/28; H04W 72/04; H04W 76/10; H04W 88/10
USPC ......... 342/351; 343/702, 876; 370/252, 328; 375/219, 260, 367, 295, 316; 455/67, 77, 455/103, 556.1
See application file for complete search history.

(56) References Cited

U.S. PATENT DOCUMENTS 10,171,947 B2    1/2019  Yoo
10,321,463 B1 *  6/2019  Ramasamy ......... H04W 72/085
(Continued)

*Primary Examiner* — Shawkat M Ali
(74) *Attorney, Agent, or Firm* — Prol Intellectual Property Law, PLLC; H. Kenneth Prol

(57) ABSTRACT

A system and method of optimizing a selection of an antenna on an information handling system comprising executing a sensor module to receive data from a plurality of sensors for tracking orientations, configurations, and locations of the information handling system and an antenna performance tracking system for measuring antenna performance parameters at a plurality of locations and training an antenna selection machine learning algorithm of an antenna selection machine learning module with training inputs of the orientations, configurations, and antenna performance parameters for a plurality of locations to determine an antenna system recommendation from a plurality of available antenna systems deployed on the information handling system. Executing the trained antenna selection machine learning module with operating inputs for an orientation and configuration at an operation location to determine a recommended antenna system from the plurality of available antenna systems for use in wireless communication.

20 Claims, 8 Drawing Sheets

(56) References Cited

U.S. PATENT DOCUMENTS

| | | |
|---|---|---|
| 10,667,157 B2 | 5/2020 | Rahmati |
| 10,798,598 B2 | 10/2020 | Alvarez |
| 2012/0265717 A1 | 10/2012 | Narayanan |
| 2014/0206297 A1* | 7/2014 | Schlub ................ H04B 1/401 |
| | | 455/77 |
| 2017/0310002 A1* | 10/2017 | Files ................ H04M 1/0243 |
| 2019/0173594 A1 | 6/2019 | Davaadorj |

* cited by examiner

| Mode | Looks |
|---|---|
| 305 — Laptop Configuration | |
| 310 — Stand Configuration | |
| 315 — Tent Configuration | |
| 320 — Modified Stand Configuration | |
| 325 — Tablet Configuration | |

FIG. 3

SYSTEMS AND METHODS TO UTILIZE CONTEXTUAL AWARENESS AND MACHINE LEARNING TO OPTIMIZE ANTENNA SELECTION

FIELD OF THE DISCLOSURE

The present disclosure generally relates to wireless network communication. The present disclosure more specifically relates to optimizing the selection among wireless antenna options on an information handling system connected to a network.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include one or more antenna systems that allow for the communication of the information handling system to a remote network wirelessly.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a graphical table describing a plurality of orientation modes of a mobile information handling system according to an embodiment of the present disclosure;

The use of the same reference symbols in different drawings may indicate similar or identical items.

DETAILED DESCRIPTION OF THE DRAWINGS

Figure 1:
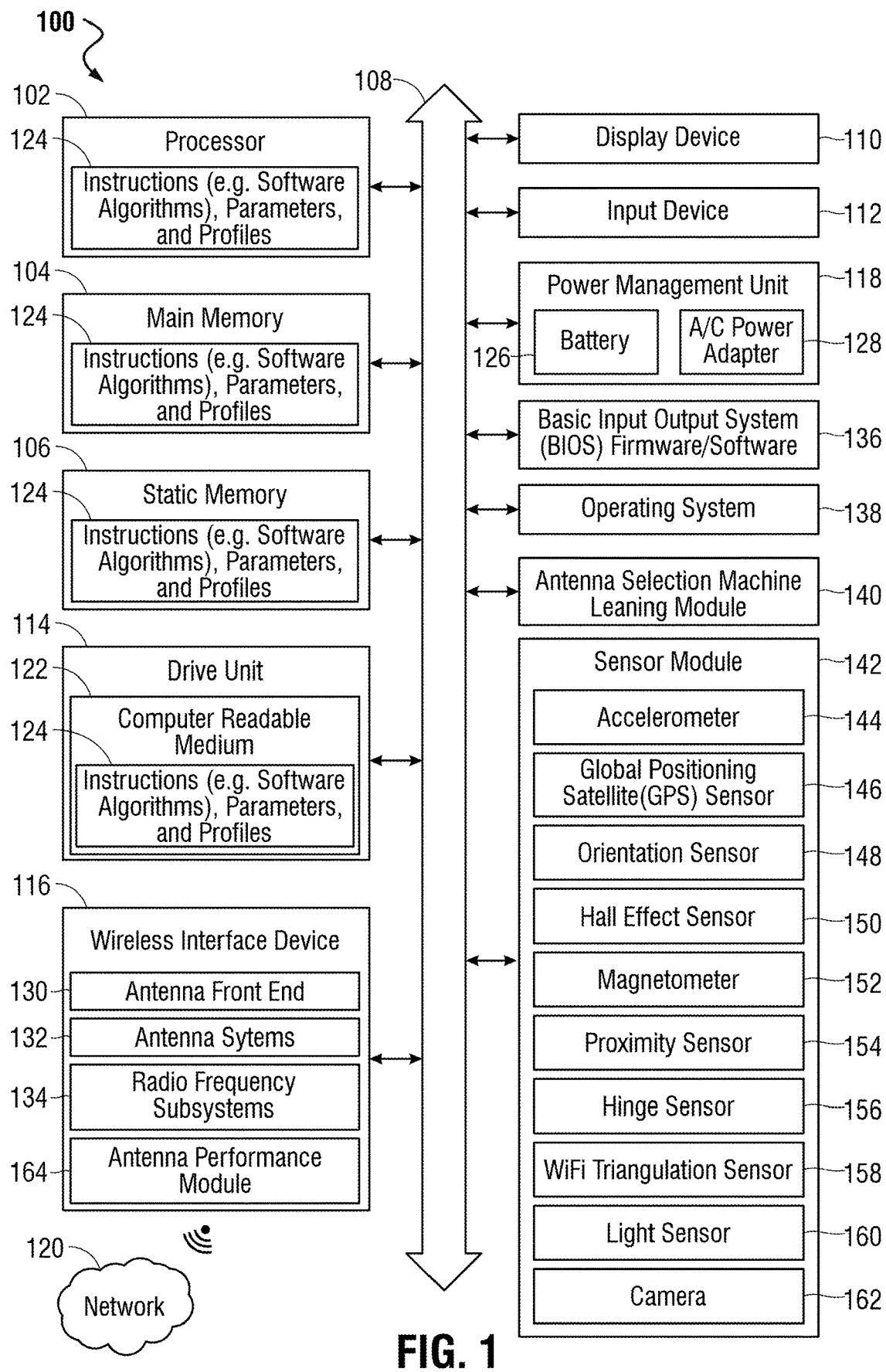
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for the tracking of an orientation, location, configuration, and direction while also measuring performance of a plurality of different antennas on an information handling system. The data generated from this tracking and measuring may be conducted over time in order to learn, via a machine learning process, which antenna or wireless protocol has the best performance for combinations of each tracked parameter. The performance of any antenna within the information handling system, especially those implementing mm-wave (>6 GHz) communications, is highly susceptible to the orientation of the information handling system, access point (AP) location relative to the information handling system, and even the direction of movement of the information handling system. While providing the most advanced wireless performance in terms of latency and bandwidth, mm-wave signals can have serious dropout issues between AP locations based on an orientation of the information handling system and any intervening structures including portions of the information handling system itself. A machine learning algorithm or process may also receive, as input, multiple parameters from multiple crowd-sourced information handling systems and locations to provide a recommendation to the information handling system based on its specific location, orientation, and configuration. This recommendation can influence which radio and/or antenna array the information handling system should enable to get the optimal connection with any access point.

The present specification describes a method of optimizing a selection of an antenna on an information handling system that includes, with a sensor module executed by a processor of an information handling system, tracking an orientation, configuration, and location of the information handling system. In an embodiment, an antenna performance module may measure antenna performance parameters to develop, via machine learning techniques executed by an antenna selection machine learning module, antenna use profiles at a tracked orientation, configuration, and location of the information handling system. The antenna selection machine learning module executed by the processor may also receive crowd-sourced parameters descriptive of antenna use profiles associated with a plurality of remote information handling systems to further develop antenna use profiles in some embodiments. The antenna selection machine learning module may, in some embodiments, provide a prioritized list of antenna recommendations to be used to communicatively couple the information handling system to a network. In some embodiments, the processor may select a first recommendation from the prioritized list of antenna recommendations. A network interface device may then operate a first antenna used to propagate a frequency associated with the first recommendation from the prioritized list of antenna recommendations, and with that first antenna, operatively couple the information handling system to the network in some embodiments.

In an embodiment, measuring antenna performance parameters determined by the antenna performance module may further include measuring a received signal strength indicator (RSSI), bit error rates, bandwidth, latency levels, congestion indicators, signal drops, and other quality of signal indicators at an antenna from among a plurality of available antenna systems deployed for wireless communication on the information handling system. In an embodiment, operatively coupling the information handling system to a wireless network may include connecting the information handling system to the network using a second antenna selection associated with another recommendation from a prioritized list. The selection of the second antenna may be initiated, for example, when the orientation of the information handling system has changed relative to the access points or when any other parameters associated with the operation of the information handling system have changed such as a QoS metric measured at a wireless connection initiated by an initial antenna system, when the location of the information handling system has changed, and/or when the configuration of the information handling system has changed, among others. In some embodiments where the location of the information handling system has changed and is detected by the sensor module, the information handling system may initiate a wireless connection to another wireless network based on the new operating parameters detected at the information handling system and a new wireless antenna recommendation provided via the execution of the machine learning techniques by the machine learning module.

In an embodiment, an information handling system executing code instructions of a antenna selection machine learning module to optimize a selection of an antenna system includes a processor; a data storage device; a power management unit. An antenna performance module to, when executed by a controller or processor at a wireless interface device may measure antenna performance parameters for use in antenna selection via the antenna selection machine learning module. The processor or other processing logic executing the antenna selection machine learning module may develop, via machine learning techniques, antenna use profiles at a combination of parameters that may include a tracked orientation, configuration, and location of the information handling system. The antenna selection machine learning module may, when executed by the processor, receive crowd-sourced parameters descriptive of antenna use profiles associated with a plurality of remote information handling systems to further develop antenna use profiles in some embodiments. The antenna selection machine learning module may then provide a prioritized list of antenna recommendations based on the combination of parameter inputs to a trained machine learning algorithm in some embodiments. The recommendations from the antenna selection machine learning module may be used to communicatively couple the information handling system to a wireless network via a selected antenna system of a protocol available on that antenna system.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality. In a specific embodiment, the information handling system 100 may be a 2-in-1 computing device, such as a convertible laptop or convertible dual screen computing system, that is capable of being put in multiple orientations such as a tablet configuration, a dual tablet configuration, a laptop configuration, a tent mode configuration, a book configuration, as well as several other configurations described herein. In an embodiment, orientation sensors may detect a physical configuration in accordance with embodiments herein including relative location and orientation of housings relative to one another for each of tablet configuration, a dual tablet configuration, a laptop configuration, a tent mode configuration, a book mode configuration, as well as other configurations and relative orientation and location of antenna systems as well as their antenna transmission patterns for RF radiation during wireless communications. The present specification presents the embodiments in terms of a 2-in-1 laptop computing device being used, however, this is not meant to be limiting and the present specification contemplates that the methods and systems described herein may be used for any other type of information handling system 100 as described herein. For example, embodiments herein apply to tablet computing devices, dual screen table computing devices, and other mobile information handling systems.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), a graphical processing unit (GPU), a smart network interface controller (NIC), control logic, embedded controllers, or some combination of the same. Any of the processing resources may operate to execute code that is either firmware or software code. Moreover, the information handling system 100 can include memory such as main memory 104, static memory 106, computer readable medium 122 storing instructions 124 of the basic input/output system (BIOS) 136 software or firmware, operating system (OS) 138, machine learning module 140, sensor module 142, antenna performance module 164, and drive unit 114 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input, and a keyboard). The information handling system 100 can also include a disk drive unit 114.

The network interface device shown as wireless interface device 116 can provide connectivity to a network 120, e.g., a wide area network (WAN), a local area network (LAN), wireless local area network (WLAN), a wireless personal area network (WPAN), a wireless wide area network (WWAN), or other networks. Connectivity may be via wired or wireless connection. The wireless interface device 116 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless interface device 116 may operate two or more wireless links via two or more antenna systems 132 deployed in the information handling system.

The wireless interface device 116 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

Other example communication frequency bands capable of be being transmitted by the radio frequency subsystems 134 and antenna systems 132 may also include unlicensed 5 GHz frequency bands or 3.5 GHz conditional shared communication frequency bands under FCC Part 96, various 5G spectrum bands that operate in FR1 (sub-6 GHz) or FR2 (>6 GHz) bands, Wi-Fi ISM frequency bands that could be subject to future sharing include 2.4 GHz, 60 GHz, 900 MHz or similar bands. Within a local portion of the communication network the information handling system is communicatively coupled to, access points for Wi-Fi or WiGig as well as small cell WWAN connectivity may be available in emerging 5G technology. By way of example, a licensed spectrum may include those spectrums associated with a public LTE communication network, private LTE communication network, 5G NR cellular, a CBRS, or any other communication network that is regulated by a governmental agency such as the FCC.

The wireless interface device 116 includes one or more antenna front end systems 130 which may operate to modulate and demodulate signals, set signal transmission power levels or sensitivity to signal reception, select channels or frequency bands, and conduct other functions in support of a wireless transmission from one or more antenna systems 132 to an access point and, accordingly, to a communication network under several wireless protocols and in various frequency communication bands as described. The antenna front end system or systems 130 may interact with, in an embodiment, an antenna performance module 164 to execute instructions as disclosed herein for monitoring wireless link state information, endpoint configuration data, network slice data, access point load data, or other input data to generate channel estimation and determine antenna radiation patterns as well as to measuring antenna performance parameters of any given antenna, signal strength of a signal or quality of service (QoS) characteristics from wireless protocol access points. This may be done by the antenna performance module 164 and provided for inputs to machine learning techniques executed by an antenna selection machine learning module 140 to develop antenna use profiles at a tracked orientation, configuration, and location of the information handling system among other possible parameters. In an embodiment, a processor or a controller may execute software or firmware applications or algorithms which utilize one or more wireless links for wireless communications via the wireless interface device 116 as well as other aspects or components in order to facilitate these processes. For example, a controller or processing at the wireless interface device 116 may execute the antenna performance module 164 to assess operation and quality assessments of one or more antenna systems 132 deployed on the information handling system 100. The wireless interface device 116 may include one or more radio frequency subsystems 134 with transmitter/receiver circuitry, modem circuitry, one or more antenna front end circuits 130, one or more wireless controller circuits such as the antenna performance module 164, amplifiers, antenna systems 132 and other radio frequency subsystem circuitry for wireless communications via multiple radio access technologies. Each radio frequency subsystems 134 may communicate with one or more wireless technology protocols. The radio frequency subsystems 134 may contain individual subscriber identity module (SIM) profiles for each technology service provider and their available protocols for subscriber-based radio access technologies such as cellular LTE communications.

The information handling system 100 may further include a power management unit (PMU) 118 (for a power supply from an A/C power source or battery power source). The PMU 118 may manage the power provided to the components of the information handling system 100 such as the processor 102, a cooling system, one or more drive units 114, the display device 110, processor logic executing the antenna selection machine learning module 140, processor logic executing the sensor module 142 or sensors, the wireless interface device 130 or other processing logic executing the antenna performance module 164, the wireless interface device 130, and other components that may require power when a power button has been actuated by a user. In an embodiment, the PMU 128 may be electrically coupled to the components via power rails to provide this power. The PMU 118 may regulate power from a power source such as a battery 126 and A/C power adapter 128. In an embodiment, the battery 126 may be charged via the A/C power adapter 128 and provide power the to the components of the information handling system 100 when A/C power from the A/C power adapter 128 is removed. The PMU 128 may communicate data about power systems and power states via bus 108 to other systems of the information handling system.

Information handling system 100 includes a BIOS 136 in the form of firmware, software, or a combination thereof. The BIOS 136 functions to initialize information handling system 100 on power up, to launch an OS 138, and to manage input and output interactions between the OS 138 and the other elements of information handling system 100. In a particular embodiment, the BIOS 136 resides in main memory 104, and includes machine-executable code that is executed by processor 102 to perform various functions of information handling system 100. In another embodiment, application programs as a part of various instructions, parameters, and profiles 124 and BIOS 136 reside in another storage medium of information handling system 100. For example, application programs and code associated with the BIOS 136 may reside in flash memory, in a ROM associated with information handling system 100, in an option-ROM associated with various devices of information handling system 100, in static memory 106, in another storage medium of information handling system 100, or in any combination thereof. Application programs and code associated with the BIOS 136 may each be implemented as single programs, or as separate programs carrying out the various features as described herein.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

The information handling system 100 can include a set of instructions 124 that can be executed to cause the computer system to perform any one or more of the methods or computer-based functions disclosed herein. For example, instructions 124 may execute an antenna selection machine learning module 140, a sensor module 142, an antenna performance module 164, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 114 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 114 and static memory 106 may also contain space for data storage. Further, the instructions 124 may embody one or more of the methods or logic as described herein. For example, instructions relating to the antenna selection machine learning module 140, sensor module 142, and antenna performance module 164 software algorithms, processes, and/or methods may be stored here. In a particular embodiment, the instructions, parameters, and profiles 124 may reside completely, or at least partially, within the main memory 104, the static memory 106, and/or within the disk drive 114 during execution by the processor 102 of information handling system 100. As explained, some or all of the antenna selection machine learning module 140, the sensor module 142, and the antenna performance module 164 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The antenna selection machine learning module 140, sensor module 142, or antenna performance module 164 may be stored in static memory 106, or the drive unit 114 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

As described, the information handling system 100 may also include a sensor module 142 that may be operably connected to the bus 108. Any computer-readable associated with the sensor module 142 may be stored computer readable medium may also contain space for data storage. The sensor module 142 may, according to the present description, perform tasks related to tracking an orientation, configuration, and location of the information handling system 100. In an embodiment, the sensor module 142 may receive input from any number of sensors and organize the data from that input in order to track the orientation, configuration, and location of the information handling system 100. These sensors may include an accelerometer 144, a global positioning satellite (GPS) sensor 146, an orientation sensor 148, a hall effect sensor 150, a magnetometer 152, a proximity sensor 154, a hinge sensor 156, a WiFi triangulation sensor 158, a light sensor 160, and a camera 162. Each of these sensors may provide data to the sensor module 142 that may take one or more forms in order to describe the orientation, configuration, and location of the information handling system 100 at any given time.

In an embodiment, the accelerometer 144 may include any type of radial accelerometer and any type of linear accelerometer that measure the radial (3D directional rotation) and linear acceleration of the information handling system 100. In the present specification, the accelerometer 144 may be any type of sensor that measures the rate of change of velocity of any portion of the information handling system 100. In an embodiment, the accelerometer 144 may determine whether the information handling system 100 is moving or being oriented a certain way. Thus, in an embodiment, the accelerometer 144 may provide data to the sensor module 142 descriptive of the orientation of the information handling system 100. The accelerometer 144 may be many of a variety of motion sensors described herein. Again, any data obtained by the accelerometer 144 is presented to the sensor module 142 for the sensor module to interpret and present to the antenna selection machine learning module 140 as descried herein.

The GPS sensor 146 may provide data to the sensor module 142 descriptive of the position of the information handling system 100 on the earth as well as the location of the information handling system 100 relative to, for example, an access point in an embodiment. In an embodiment, a GPS triangulation method may be implemented by the GPS sensor 146 in order to find the position of the information handling system 100. Again, any data obtained by the GPS sensor 146 is presented to the sensor module 142 for the sensor module to interpret and present to the antenna selection machine learning module 140 as descried herein.

The orientation sensor 148 may, through a variety of sensors placed within the information handling system 100, detect the orientation of the information handling system 100. This may be done through the use of an accelerometer 144, a magnetometer 152, and a camera 162, for example, that allow the orientation sensor 148 to determine the orientation of the information handling system 100 within a three-dimensional space. The orientation sensor 148 may accumulate this data and provide it to the sensor module 142 for interpretation and manipulation.

The sensor module 142 may further use a variety of sensors to detect a configuration of the information handling system such as a tablet configuration, a dual tablet configuration, a laptop configuration, a tent mode configuration, a book configuration, as well as several other configurations described herein. These variety of sensors may include, in an embodiment, a hall effect sensor 150, a magnetometer 152, a proximity sensor 154, a hinge sensor 156, a light sensor 160, and a camera 162, among other sensors.

In an embodiment, the hall effect sensor 150 may be placed at any location within the chassis of the information handling system 100 to detect the position of the individual parts of the information handling system 100 relative to each other. In a specific embodiment where the information handling system 100 is a laptop-type information handling system 100, the hall effect sensor 150 may be placed in one or more of a display portion or base portions of the information handling system 100. In this embodiment, the hall effect sensor 150 may detect when the display portion is moved away from a top surface of a based portion, a relative position of the display portion to the base portion, and/or when a back side of the display portion is placed against a bottom portion of the base portion of the information handling system 100. As described herein, this allows the hall effect sensor 150 to detect and the sensor module 142 to know whether the laptop-type information handling system 100 is placed in a tablet configuration, a dual tablet configuration, a laptop configuration, a tent mode configuration, a book configuration, as well as several other configurations described herein. The hall effect sensor 150 may be similarly used in a dual screen-type information handling system 100 in order to detect the relative positions of each of the screens. Again, any data obtained by the hall effect sensor 150 is presented to the sensor module 142 for the sensor module to interpret and present to the antenna selection machine learning module 140 as descried herein.

In an embodiment, the magnetometer 152 may measure the earth's magnetic field at any location in order to detect an orientation of the information handling system 100 relative to that magnetic field. In a specific embodiment, the magnetometer 152 may be a three-axis magnetometer that eliminates the sensitivity to the way in which the information handling system 100 is held or positioned. Again, any data obtained by the magnetometer 152 is presented to the sensor module 142 for the sensor module to interpret and present to the antenna selection machine learning module 140 as descried herein.

The proximity sensor 154, in an embodiment, may detect the presence of objects around the information handling system 100 that may reduce the ability of the antenna systems 132 of the information handling system 100 to transmit data to the network 120. For example, a proximity sensor 154 may include a capacitive sensor, an infrared sensor, an inductive sensing system or other sensors understood in the art. As described herein, the mm-wave signals can have serious dropout issues between AP locations when the mm-wave frequencies are forced to access, for example, and AP through an object. The proximity sensor 154 may determine the location and presence of these objects and provide this data to the sensor module 142. Additionally, the proximity sensor 154 may, similar to the hall effect sensor 150 detect the position of the display portion of the information handling system 100 relative to the base portion in a laptop-type or dual-screen-type information handling system 100. Again, any data obtained by the proximity sensor 154 is presented to the sensor module 142 for the sensor module to interpret and present to the antenna selection machine learning module 140 as descried herein.

The hinge sensor 156 may be used to detect, similar to the hall effect sensor 150 and proximity sensor 154, the position of the display portion relative to the base portion in a laptop-type information handling system 100. In this embodiment, the hinge sensor 156, being placed within a hinge operatively coupling the display portion to the base portion, may determine an angle of the display portion relative to the base portion. In the embodiment where the information handling system 100 is a dual-screen-type information handling system 100, the hinge sensor 156 may also be placed in a hinge that operatively couple a first scree to a second screen. Again, any data obtained by the hinge sensor 156 is presented to the sensor module 142 for the sensor module to interpret and present to the antenna selection machine learning module 140 as descried herein.

The light sensor 160 may detect, in an embodiment, light emitted from a light source on the information handling system 100. This light source may omit infrared (IR) light, that is detectable by the light sensor 160 in order to determine the position of the display portion of the information handling system 100 relative to its base portion in the laptop-type information handling system 100. This may be similar for a dual-screen-type information handling system 100 where the position of the first screen portion to the second screen portion may be detected. In an embodiment, the light sensor 160 may also detect light transceive ted from, for example, an access point used to operatively couple the information handling system 100 to the network 120. In this embodiment, the access point or other network device may emit an IR light that is or is not detected by the light sensor 160 in order to determine whether an object is between the access point and the information handling system 100. Again, the mm-wave signals can have serious dropout issues between AP locations when the mm-wave frequencies are forced to access, for example, and AP through an object. The light sensor 160 may be another sensor that may be included within the information handling system 100 in order to detect these obstacles. Again, any data obtained by the light sensor 160 is presented to the sensor module 142 for the sensor module to interpret and present to the antenna selection machine learning module 140 as descried herein.

The information handling system 100 may also include, in an embodiment, a camera 162 used to detect the position of objects within a room or environment the information handling system 100 has been placed. Such a camera 162 may be a visible light camera system or an infrared camera system in various embodiments. In this embodiment, the camera 162 may interface with the processor 102 in order to execute image recognition code to detect and determine what objects may be placed or have moved between the information handling system 100 and an access point. In a specific embodiment, the camera 162 may create an image of those objects around the information handling system 100, cause the processor 102 to execute the image recognition code, determine what the object is, and provide data to the sensor module 142 indicative of an expected mm-wave permeability of the object. For example, the execution of the image recognition code may determine whether the object is a human, a wall, or some other object and determine whether the mm-wave frequencies could permeate that object. Again, any data obtained by the camera 162 and processor 102 (upon execution of the image recognition code) is presented to the sensor module 142 for the sensor module to interpret and present to the antenna selection machine learning module 140 as descried herein.

As described the information handling system 100 includes an orientation sensor 148 that detects the orientation of the information handling system 100. Because the orientation of the information handling system 100 may affect any antenna system's ability to transceive data at a specific frequency, the orientation sensor 148 may indicate to the sensor module 142 what orientation that the information handling system 100 is in. The orientation sensor 148 may interact with, in an embodiment, other sensors such as the hall effect sensor 150, the proximity sensor 154, the hinge sensor 156, the light sensor 160, and the camera 162, among others to determine what orientation (e.g., a tablet configuration, a dual tablet configuration, a laptop configuration, a tent mode configuration, a book configuration) the information handling system 100 is in. Again, any data obtained by the orientation sensor 148 is presented to the sensor module 142 for the sensor module to interpret and present to the antenna selection machine learning module 140 as descried herein.

The WiFi triangulation sensor 158 may use a WiFi signal to triangulate the position of the information handling system 100 relative to two or more access points. In an embodiment, the position data provided to the sensor module 142 by the WiFi triangulation sensor 158 may be local information or may be geographical information based on a known location of the access points near the information handling system 100. Again, any data obtained by the WiFi triangulation sensor 158 is presented to the sensor module 142 for the sensor module to interpret and present to the antenna selection machine learning module 140 as descried herein.

In an embodiment, the sensor module 142 may communicate with the main memory 104, the processor 102, the video display 110, the alpha-numeric input device 112 such as a keyboard, and the wireless interface device 116 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

As described, the information handling system 100 may also include an antenna performance module 164 in the wireless interface device 116 that may be operably connected to the bus 108. Any computer-readable medium associated with the antenna performance module 164 may also contain space for data storage. The antenna performance module 164 may, according to the present description, perform tasks related to measuring antenna performance parameters to develop antenna use profiles via the antenna selection machine learning module 140 at a tracked orientation, configuration, and location of the information handling system. In an embodiment, the antenna use profiles developed by the antenna performance module 164 are based on the data provided by the sensor module 142 such that the measured antenna performance of any given antenna, at any given frequency, oriented in any direction, with an any angle of attack or directionality of the signal, at a specification location within the information handling system 100 while the information handling system 100 is in a certain orientation. These antenna use profiles may be used in training an antenna selection machine learning module 140. As described herein, some antenna systems 132 within the information handling system 100 may transceive frequencies in the FR1 and FR2 frequency range. These frequencies are often associated with 5G communications that allow for relatively larger amounts of data being capable of being transmitted from the information handling system 100. However, the ability for these frequencies to penetrate surfaces (e.g., a housing of the information handling system 100) and a result of the reduced effective radius of the signal as the frequency increases, the ability of some of these antenna systems 132 to transmit the signals may be effected by these different locations, orientations, and configurations. As the location, orientation, and configuration of the information handling system 100 is tracked by the sensor module 142, the antenna performance module 164 may select a specific antenna system 132 (e.g., 5G antenna systems, sub-6 GHz antenna systems, WiFi antenna systems, among others) that would best transmit data to, for example, an access point (AP).

In some specific embodiments, the antenna performance module 164 may further measure antenna performance parameters that are independent of the antenna systems 132 and instead describe the characteristics of the quality of service (QoS) related to the access points to which the information handling system 100 is communicatively coupled to a network 120. This QoS may include any characteristics associated with a link quality between any of the antenna systems 132 of the information handling system 100 and the access points that have been historically detected. These characteristics in QoS include a received signal strength indicator (RSSI), bandwidth, and signal strength. In an embodiment, the information handling system 100 may store data regarding this QoS data in the form of historic data indicating which of a specific number of access points provide the best QoS for each of the antenna systems 132. This QoS historic data may be stored on, for example, the main memory 104 or any other storage device associated with the information handling system 100.

The information handling system 100, in the embodiments described herein, further includes an antenna selection machine learning module 140. The antenna selection machine learning module 140 may execute any type of machine learning in order to, over time, learn which antenna systems 132, wireless protocols, and frequencies has the best performance in light of each of the QoS parameters, orientation, direction, configuration, and location of the information handling system 100.

In an embodiment, the antenna selection machine learning module 140 receives as input the location, orientation, and configuration data of the information handling system 100. The location, orientation, and configuration data of the information handling system 100 may be received by the antenna selection machine learning module 140 from the sensor module 142 as described herein. The antenna selection machine learning module 140 may also receive, as input, the connection quality, available bandwidth, latency, antenna parameters historically associated with any of the antenna systems 132, and any other associated QoS metric detected by the information handling system 100. The antenna selection machine learning module 140 may execute any machine learning classifier or other deep learning supervised learning system to provide a recommendation as to which of the antenna systems 132 to be used based on the location, orientation, and configuration data of the information handling system 100 and the historical antenna use profiles. In an embodiment, the antenna selection machine learning module 140 may provide a prioritized list of antenna recommendations to be used to communicatively couple the information handling system to a network.

In an embodiment, the antenna selection machine learning module 140 may take multiple inputs as described herein in order to provide a recommendation or generate a prioritized list of antenna recommendations to be used to communicatively couple the information handling system to a network. This training process may, therefore, build a mathematical model (e.g., neural network model or other machine learning model) based on the sampled data received from the sensor module 142 and antenna performance module 164 in order to generate a recommendation or to create this prioritized list.

By way of example, the antenna selection machine learning module 140 may direct the receipt of training input from the sensor module 142 and antenna performance module 164 describing the orientation, location, configuration, direction (where the information handling system 100 is being moved), and the performance of a plurality of different antennas and may, with this training data, execute any type of machine learning process. These machine learning processes may include any type of supervised learning process (i.e., support vector machines, linear regression, logistic regression, naïve Bayes, linear discrimination analysis, decision trees, k-nearest neighbor algorithm, neural networks, and similarity learning, among others) or unsupervised learning process (i.e., clustering, anomaly detection, neural networks, and any latent carriable models, among others) to generate the prioritized list of antenna recommendations to be used to communicatively couple the information handling system to a network.

By way of example, a user may, during use of the information handling system 100, alter the configuration of the information handling system 100 (e.g., a 2 in 1 laptop), move the orientation of the information handling system, grab the information handling system 100 directly at a location where the antenna of the information handling system 100 is present, walk away from an original location beyond a threshold distance, be in a location where an object is moved in between the information handling system 100 and an access point, or otherwise arrange the information handling system 100 into a different configuration. Alternatively, or additionally, the antenna performance module 164 may detect a change in the QoS at the network 120 or a change in antenna performance related to any of the antenna systems 132. In this example, the antenna selection machine learning module 140 may consider that a new or different antenna system 132 may need to be used based on these considerations and may take into consideration the level of transmission power emitted by any of the other antenna systems 132 that may increase the reliability of the data transmission from the information handling system 100 to an access point within the network 120. Because of all of these factors, the output resulting from the execution of the antenna selection machine learning module 140 may vary and may not be determined without sufficient training data presented to information handling system 100 as well as the type of supervised or unsupervised learning algorithm used. As a consequence of implementing the antenna selection machine learning module 140, the output presented by the antenna selection machine learning module 140 to the information handling system may improve, whenever possible, the ability of the information handling system 100 to transceive data from a selection of wireless antenna systems 132 by the wireless interface device 116 to and from the networks 120 available via those antenna systems 132.

The output from the antenna selection machine learning module 140 may, in an embodiment, specifically identify an antenna system 132 that optimizes the transceiving capabilities of the information handling system 100. This optimization may be further defined by the type of applications being executed on the information handling system 100, in an embodiment. In this embodiment, the information handling system 100 may determine that, for example, an email program is running on the system. In this specific example, the antenna selection machine learning module 140 of the information handling system 100 may receive, as input, this additional data and provide an antenna system 132 recommendation that does not rely on low latency or high bandwidth requirements. As such, the antenna selection machine learning module 140 may further add weighting values to the input (e.g., input from the sensor module 142 and antenna performance module 164) in order to provide a recommendation that is most appropriate for current-use scenarios of the information handling system 100. Each assigned weight to any of the input values in the model created by the antenna selection machine learning module 140 describes a likelihood that any given input is more important relative to other inputs. It is then appreciated that where a user initiates the execution of, for example, an internet gaming application, the antenna selection machine learning module 140 may receive this additional input, provide a weighting to this data, and provide as output a recommendation as to whether to change the type of antenna system 132 used and, if so, which different antenna system 132 to use to operatively couple the information handling system 100 to the network 120. As described, any type of machine learning algorithm may be used along with any type of input weighting scheme in order to provide, to the information handling system 100, the prioritized list of antenna systems 132 to use to operatively couple to the information handling system 100 to the network 120 and the present specification contemplates these different algorithms and weights.

In an embodiment, the antenna selection machine learning module 140 may receive additional data related to antenna use profiles associated with a plurality of remote information handling systems. These remote information handling systems along with the information handling system 100 described herein may each be communicatively coupled to a crowd sourcing database with each of the information handling system 100 and remote information handling systems providing their respective recommended antenna use profiles to this crowd sourcing database to which the information handling system 100 and specifically the antenna selection machine learning module 140 gains access to.

As the antenna selection machine learning module 140 gains access to the crowd sourcing database (e.g., via a smart NIC), the antenna selection machine learning module 140 also receives and incorporates the crowd-sourced parameters descriptive of antenna use profiles associated with the plurality of remote information handling systems to, with the developed antenna use profiles, provide a prioritized list of antenna recommendations to be used to communicatively couple the information handling system to a network. Again, the antenna selection machine learning module 140 may use these new antenna use profiles from the crowd sourcing database as input in order to further refine and generate the prioritized list of antenna recommendations. In an embodiment, each of the remote information handling systems may also include an antenna selection machine learning module, sensor module, and antenna performance module similar to that included within the information handling system 100 described in FIG. 1. Each of these remote information handling systems may, with a sensor module executed by a processor, track an orientation, configuration, and location of the remote information handling system and, with an antenna performance module executed by the processor, measure antenna performance parameters to develop, via a machine learning technique executed by an antenna selection machine learning module, antenna use profiles at a tracked orientation, configuration, and location of the information handling system. The presently described information handling system 100 may incorporate these generated antenna use profiles and, with the antenna selection machine learning module 140, provide the prioritized list of antenna recommendations to be used to communicatively couple the information handling system 100 to a network.

During further operation of the information handling system 100, the processor 102 may select a first recommendation from the prioritized list of antenna recommendations, operate a first antenna used to propagate a frequency associated with the first recommendation from the prioritized list of antenna recommendations, and, with the first antenna, operatively coupling the information handling system to the network. The antenna selected may include one or more of a mm-wave 60 GHz antenna, a mm-wave 37 GHz antenna, a mm-wave 28 GHz antenna, a 5G sub-6 GHz antenna, a 4G antenna, a WiFi antenna, among others. Each of these antennas may transceive their respective frequencies based on the recommendations provided by the antenna selection machine learning module 140. This process allows for the use of the highest frequency to transmit data weighed against the ability of that signal to reach an access point.

In an embodiment and during operation of the information handling system 100, the user may carry the information handling system 100 into an area not previously visited by the user or in which the information handling system 100 has been communicatively coupled to an AP. In this embodiment, the antenna selection machine learning module 140 has not generated any antenna use profiles associated with the information handling system 100 accessing any AP in the area. As such, although the sensor module 142 executed by a processor 102 has tracked an orientation, configuration, and location of the information handling system 100, any antenna performance data has not been measured by the antenna performance module 164. In this embodiment, the antenna selection machine learning module 140 may rely on the crowd sourced data from the plurality of remote information handling systems to provide the prioritized list of antenna recommendations to be used to communicatively couple the information handling system to a network. In this embodiment, the antenna use profiles and location, orientation, and configuration data gathered by the remote information handling systems may be used by the antenna selection machine learning module 140 to create the prioritized list. This specifically allows the information handling system 100 to attempt to communicatively couple an antenna system 132 to an AP using a first recommendation presented on the prioritized list of antenna recommendations instead of activating, one-by-one, each of the antenna systems 132 in order to attempt to communicatively couple the information handling system 100 to an AP and the network 120. This process reduces the amount of time taken to establish the communication between the AP and the information handling system 100. Additionally, the process reduces the power consumed by the information handling system 100 by reducing the number of potential antenna systems 132 activated. Still further, this process executed by the information handling system 100 provides for the activation of the most beneficial antenna system 132 to be used to communicate with the network 120. This most beneficial antenna system 132 may be selected based on the ability of any given antenna system 132 to quickly transmit large amounts of data while also maintaining communication with the AP and network 120 due to a relatively stable signal quality. In this way, with the use of both crowd sourced data from the remote information handling systems as well as location, orientation, and configuration data of the information handling system 100, the information handling system 100 may best communicate with the network 120.

In an embodiment and during operation of the information handling system 100, the user may carry the information handling system 100 into an area previously visited by the user or in which the information handling system 100 had been communicatively coupled to an AP within the area. In this embodiment, the antenna selection machine learning module 140 may access location, orientation, and configuration data of the information handling system 100 to determine that the area has been visited before by reviewing a history of location data maintained on a data storage device of the information handling system 100. In this embodiment, the antenna selection machine learning module 140 may use this location, orientation, and configuration data of the information handling system 100 as well as those antenna use profiles maintained on the data storage device as input to a machine learning process executed by the antenna selection machine learning module 140. Additional input to the antenna selection machine learning module 140 may be received by the information handling system 100 from a crowd sourcing database as described herein. Again, this process specifically allows the information handling system 100 to attempt to communicatively couple an antenna system 132 to an AP using a first recommendation presented on the prioritized list of antenna recommendations instead of activating, one-by-one, each of the antenna systems 132 in order to attempt to communicatively couple the information handling system 100 to an AP and the network 120. This process reduces the amount of time taken to establish the communication between the AP and the information handling system 100. Additionally, the process reduces the power consumed by the information handling system 100 by reducing the number of potential antenna systems 132 activated. Still further, this process executed by the information handling system 100 provides for the activation of the most beneficial antenna system 132 to be used to communicate with the network 120.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
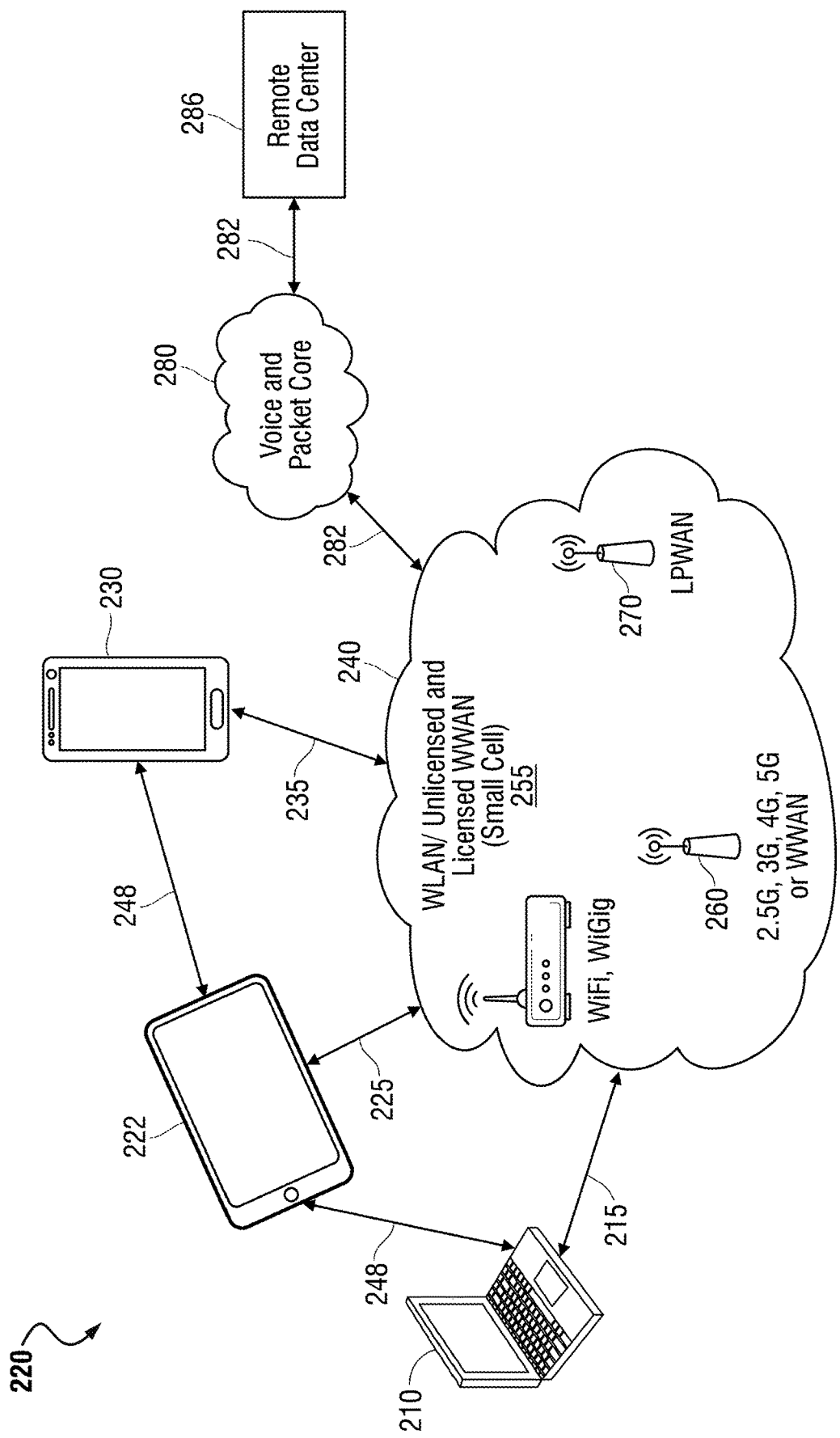
FIG. 2 is a block diagram of a network environment offering several communication protocol options and mobile information handling systems according to an embodiment of the present disclosure.

FIG. 2 is a block diagram of a network environment offering several communication protocol options and mobile information handling systems according to an embodiment of the present disclosure. FIG. 2 illustrates a macro- and micro-communication network 220 that may include a plurality of individual communication networks that communicatively couples one or more information handling systems 210, 222, 230 such as the information handling system 100 described in connection with FIG. 1 to one of these communication networks.

In a particular embodiment, network 220 includes the networked mobile information handling systems 210, 222, 230, wireless access points (APs), and multiple wireless connection link options. A variety of additional computing resources of communication network may include client mobile information handling systems, data processing servers, network storage devices, local and wide area networks, or other resources as needed or desired. As partially depicted, the information handling systems 210, 222, 230 may be a laptop computer, tablet computer, 360-degree convertible systems, wearable computing devices, a smart phone device or other computing devices. These information handling systems 210, 222, 230 may access a wireless local network or they may access a macro-cellular network via any number of access points. As described herein, the access points may include Wi-Fi-enabled access points, private and public long-term evolution (LTE)-enabled access points, and 5G new radio (NR)-enabled access points and may include a plurality of each to allow for the endpoint devices to communicate with the communication networks (e.g., a Wi-Fi communication network, a public LTE communication network, and a private LTE communication network, among others). The present specification contemplates that any number of access points may be used in order to form a multi-channel network that includes a Wi-Fi network, a 5G network, and a public and private LTE network, among others. In an example, the wireless local network may be the wireless local area network (WLAN) 255, a wireless personal area network (WPAN), or a wireless wide area network (WWAN) 255. In an example embodiment, LTE-LAA WWAN 260 may operate with a small-cell WWAN 255 wireless access point option.

Components of a wireless local network may be connected by wireline or Ethernet connections to a wider external network. For example, wireless 5G NR-enabled or other local wireless access points may be connected to a wireless network controller and an Ethernet switch. Wireless communications across wireless local network may be via standard protocols such as IEEE 802.11 Wi-Fi, IEEE 802.11ad WiGig, IEEE 802.15 WPAN, or 5G small cell WWAN communications such as gNodeB or eNodeB, IEEE 802.11, IEEE 1914/1904, IEEE P2413/1471/42010, APs implementing 802.11b, 802.11a, 802.11g, 802.11n, 802.11ac, and 802.1 lax IEEE standards, or similar wireless network protocols developed for 5G, LTE, and Wi-Fi communications.

Alternatively, other available wireless links within network may include macro-cellular network connections via one or more service providers 260, 270. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and the like. Wireless local network 240 and macro-cellular network may include a variety of licensed, unlicensed or shared communication frequency bands as well as a variety of wireless protocol technologies ranging from those operating in macrocells, small cells, picocells, or femtocells.

In some embodiments according to the present disclosure, a networked information handling system 210, 222, 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple antenna systems to enhance wireless data bandwidth. Similarly, a single antenna or plural antennas may be used on each of the information handling systems 210, 222, 230 during, for example, beamforming processes may be engaged in as described herein. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Gig ISM frequency bands that could be subject to sharing include 2.4 GHz, 5 GHz and 60 GHz bands or similar bands as understood by those of skill in the art. For embodiments herein, 5G NR frequency bands such as FR1 (e.g., n1-n3, n5, n7, n8, n12, n14, n18, n20, n25, n28-n30, n34, n38-n41, n48, n50, n51, n65, n66, n70, n71, n74-n84, n86, n89, and n90) and FR2 (e.g., n257, n258, n260, and n261) bands may be transceived at the antenna or antennas. Within local portions of wireless network 240, access points for Wi-Fi or WiGig as well as small cell WWAN connectivity may be available in emerging 5G technology. This may create situations where a plurality of antenna systems operates on an information handling system 210, 222, 230 via concurrent communication wireless links on both WLAN and WWAN or multiple concurrent wireless links to enhance bandwidth under a protocol and which may operate within the same, adjacent, or otherwise interfering communication frequency bands. The antenna or the individual antennas of an antenna array may be transmitting antennas that includes high-band, medium-band, low-band, and unlicensed band transmitting antennas. Alternatively, embodiments may include a signal transceiving antenna capable of receiving and transmitting, and/or more than one transceiving antennas.

The voice and packet core network 280 may contain externally accessible computing resources and connect to a remote data center 286. The voice and packet core network 280 may contain multiple intermediate web servers or other locations with accessible data (not shown). The voice and packet core network 280 may also connect to other wireless networks similar to 260 and 270 and additional mobile endpoint devices or similar connected to those additional wireless networks. Connection 282 between the wireless network 240 and remote data center 280 or connection to other additional wireless networks may be via Ethernet or another similar connection to the world-wide-web, a WAN, a LAN, or other network structure. Such a connection 282 may be made via an access point/Ethernet switch to the external network and be a backhaul connection. The access points may be connected to one or more wireless access points before connecting directly to an information handling system 210, 222, 230 or may connect directly to one or more information handling systems 210, 222, 230. Alternatively, information handling systems 210, 222, 230 may connect to the external network via base station locations at service providers such as 260 and 270. These service provider locations may be network connected via backhaul connectivity through the voice and packet core network 280.

Remote data center 286 may include web servers or resources within a cloud environment that operate via the voice and packet core 280 or other wider internet connectivity. For example, remote data center 286 may include additional information handling systems, data processing servers, network storage devices, local and wide area networks, or other resources as needed or desired. Having such remote capabilities may permit fewer resources to be maintained at the information handling systems 210, 222, 230 allowing streamlining and efficiency within those devices. In an example where the information handling systems 210, 222, 230 include streaming applications or other high data throughput application, those processing resources at the remote data centers may supplement the high volume of processing used to provide those processes described herein. Additionally, in the examples where the antenna selection machine learning module of the individual information handling systems 210, 222, 230 are to access a crowd sourcing database and retrieve recommended antenna use profiles generated by those remote information handling systems 210, 222, 230, the remote data center 286 may maintain that database for such use.

Similarly, remote data center 286 may permit fewer resources to be maintained in other parts of network. In some embodiments, the remote data center 286 may be a backend server that interfaces with the information handling systems described in connection with FIG. 1. In this embodiment, the remote data center 286 may include any of an evolved packet core, a telemetry data module, a communication network machine learning management module, a reallocation module, and an AP management module.

Although it is described that the access points may be communicatively coupled 215, 225, 235 wireless adapters of information handling systems 210, 222, 230 to wireless networks 260, 270, a variety of wireless links are contemplated. Wireless communication may link through a wireless access point (Wi-Fi or WiGig), through unlicensed WWAN small cell base stations such as in network 240 or through a service provider tower such as that shown with a first service provider 260 or a second service provider 270. In other aspects, information handling systems 210, 222, 230 may communicate intra-device via 248 when one or more of the information handling systems 210, 222, 230 are set to act as, for example, a 5G access point or even potentially a WWAN connection via small cell communication on licensed or unlicensed WWAN connections. Concurrent wireless links to an endpoint device may be connected via any access points including other mobile information handling systems.

In another embodiment, a remote data center 286 may further include an IoT server that maintains and directs the operations of those information handling systems 210, 222, 230 that would be considered an IoT device. As described herein, the communication network machine learning algorithm may receive data from a plurality of information handling systems 210, 222, 230 that may be considered an IoT device and therefore may transmit IoT data across the communication network.

FIG. 3 is a graphical table 300 describing a plurality of configuration modes of a mobile information handling system according to an embodiment of the present disclosure. The table 300 shows the configuration modes 305, 310, 315, 320, and 325 described herein with an indication on what the configuration modes 305, 310, 315, 320, and 325 appears for this convertible laptop type information handling system. These configuration modes 305, 310, 315, 320, and 325 may affect how transmission power of the antenna systems of the mobile information handling system is altered or otherwise limited as the changes in configuration mode are made. In some embodiments, an antenna, antenna array, and/or antenna systems of the mobile information handling system may be placed in a keyboard portion, a display portion, and/or a hinge portion of the mobile information handling system. The placement of the antenna, antenna array, and/or antenna systems as well as how the mobile information handling system is oriented alters the transmission capabilities of the antenna, antenna array, and/or antenna systems. Although the table 300 described in FIG. 3 shows five distinct configuration modes 305, 310, 315, 320, and 325, the present specification contemplates that the mobile information handling system may be placed in other configurations that may dictate how, and to what extent a transmission power of a wireless antenna is to be adjusted upon detection of those other configuration modes.

The spreadsheet shows a laptop configuration 305. The laptop configuration 305 may be a configuration mode that places a keyboard portion of the mobile information handling system on a surface with a screen portion of the mobile information handling system placed at an angle relative to the keyboard portion such that a user may view the screen on the screen portion. In this arrangement, in an embodiment, the wireless performance for an antenna may be changed if, for example, objects are placed between the antenna and an access point. When the sensors within the information handling systems, for example, do not detect movement of the mobile information handling system, the transmission power may be set to a full performance level and may be capable of transmitting data. As described herein, the data received from any of the sensors of the mobile information handling system may be received by the processor and analyzed by the sensor module. In an embodiment, as the information handling system is moved, the sensors may detect such movement and, based on the machine learning processes executed by the antenna selection machine learning module, determine whether such movement dictates that the operating antenna system may be switched out for another antenna system. In an example, motion detection may simply indicate that the mobile information handling system was shifted a small degree or otherwise bumped. However, when the sensors indicate that the mobile information handling system has changed location to a certain degree indicative of potentially new access points or closer access points, the location data detected by the sensor module may be provided to the antenna selection machine learning module. In this embodiment, the antenna selection machine learning module may access the crowd sourcing database as well as any antenna use profiles maintained on the information handling system in order to initiate or reinitiate the machine learning process so as to provide a prioritized list of antenna recommendations to be used to communicatively couple or recouple the information handling system to a network. In the embodiments described herein, this process of implementing the sensors to track an orientation, configuration, and location of the information handling system and measure antenna performance parameters with the antenna performance module may be initiated at any time the sensors detect a change relative to the information handling system or the antenna performance module detects a change in antenna performance parameters (e.g., low signal, low bandwidth, other QoS parameters). Upon detection of any of these types of changes, the relevant data is provided to the antenna selection machine learning module to either update the antenna use profiles or, based on the current antenna use profiles and recommendations accessed at the crowd sourcing database, provide the prioritized list of antenna recommendations as described herein. Thus, in an embodiment, the methods of optimizing a selection of an antenna on an information handling system may be a reiterative process that continuously provides feedback to the antenna selection machine learning module in order to secure the best or most optimal wireless connection between the information handling system and the network.

Other configuration modes 305, 310, 315, 320, and 325 of the mobile information handling system may also be realized by the user with similar affects to the antenna performance of the antenna systems. Indeed, where the configuration mode is a stand configuration 310, a tent configuration 315, a modified stand configuration 320 or a tablet configuration 325, the transmission power, QoS parameters, and antenna performance of any of the antenna systems may be affected. In these cases, the methods of optimizing a selection of an antenna on an information handling system may be initiated or reinitiated as the user places the information handling system in one of these configuration modes 305, 310, 315, 320, and 325.

Figure 4A:
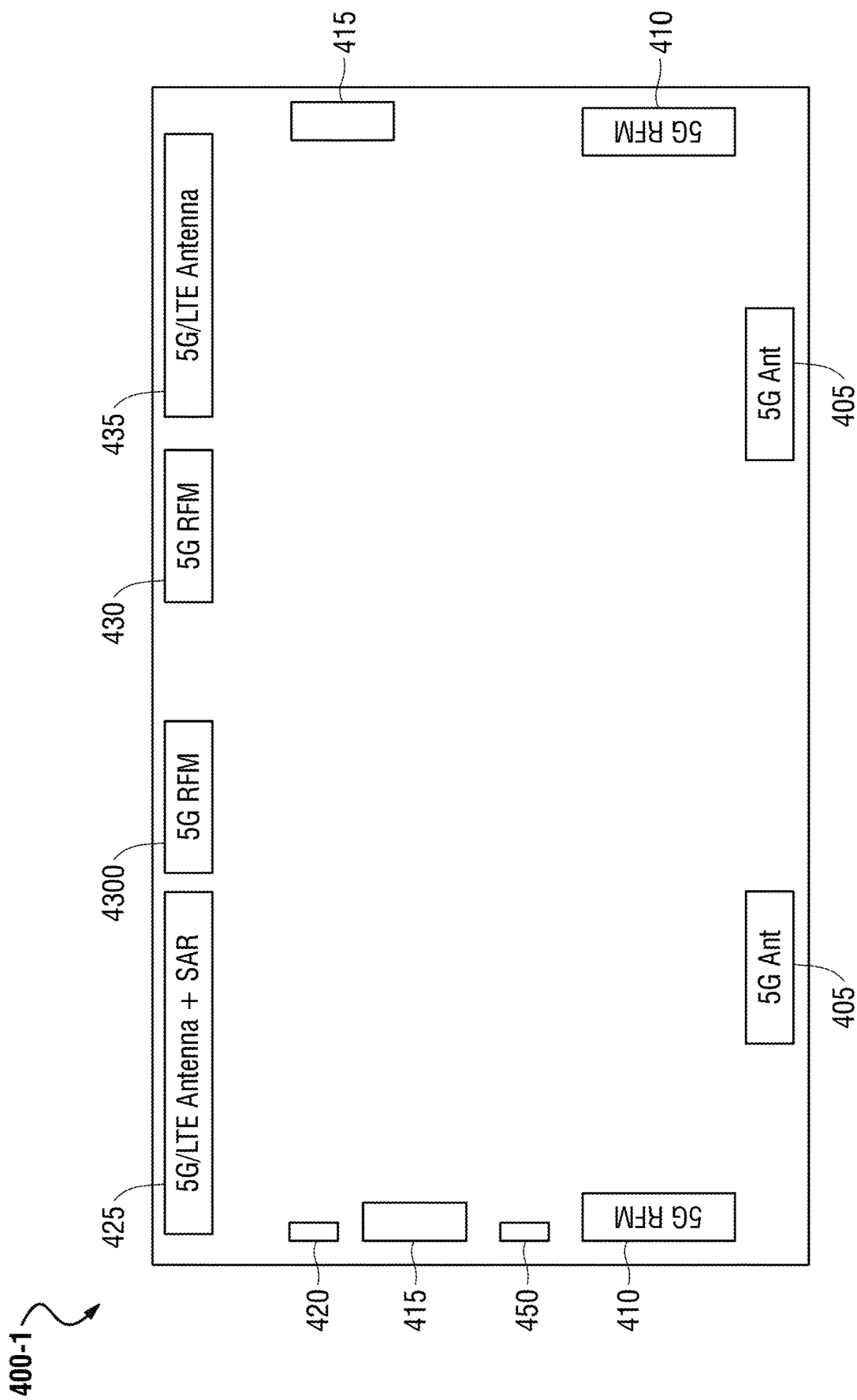
FIG. 4A is a graphical block diagram illustrating an information handling system according to an embodiment of the present disclosure.

FIG. 4A is a graphical block diagram illustrating an information handling system according to an embodiment of the present disclosure. The information handling system 400-1 of FIG. 4A shows the information handling system 400-1 in the form of a tablet computer. Although FIG. 4A shows the information handling system 400-1 as being a tablet computer, the present specification contemplates that the information handling system 400-1 may be any type of information handling system or other information handling system as described herein including a convertible laptop type information handling system.

FIG. 4A illustrates potential locations of the array of sub-six GHz antennas and potential locations of the array of mm-wave antennas according to several embodiments described herein. Although, FIG. 4A illustrates specific locations within the information handling system 400-1 of the array of sub-six GHz antennas and array of mm-wave antennas, the present description contemplates that other locations within the information handling system 400-1 are contemplated as locations within the information handling system 400-1 where these arrays may be placed. Additionally, although specific types of antennas are described that transceive data using specific frequencies, the present specification contemplates that any type of antenna may be used to operate at any specific frequency or range of frequencies.

In an embodiment, the information handling system 400-1 may include a number of antennas or antenna arrays 405, 410, 425, 430, 435 placed anywhere within the information handling system 400-1. The antennas or antenna arrays 405, 410, 425, 430, 435 may be located at a bottom edge, side edge, and/or top edge of the information handling system 400-1. In the embodiment shown in FIG. 4A, a plurality of 5G antennas or an array of antennas 405 are placed at a bottom edge of this tablet-type information handling system. In an embodiment, the 5G antennas or antenna arrays 405 may transceive at frequencies at 4 GHz. In an embodiment, the 5G antennas or antenna arrays 405 may transceive at frequencies in the FR1 and FR2 frequency range. In an embodiment, the 5G antennas or antenna arrays 405 may transceive at any of a low-(600 MHz-700 MHz), mid-(2.5-3.5 GHz), and high-band (24-39 GHz) frequency range that extend from 600 Mhz to 39 GHz.

In the embodiment shown in FIG. 4A, 5G antennas or antenna arrays 425, 435 may also be placed at a top edge of the tablet-type information handling system 400-1. The antennas or antenna arrays 425, 435 may transceive at frequencies in the FR1 and FR2 frequency range. In an embodiment, the 5G antennas or antenna arrays 405 may transceive at any of a low- (600 MHz-700 MHz), mid- (2.5-3.5 GHz), and high-band (24-39 GHz) frequency range that extend from 600 Mhz to 39 GHz. In some embodiments, the 5G antennas or antenna arrays 425, 435 may include a specific absorption rate (SAR) sensor to detect the SAR of the emission of these 5G antennas or antenna arrays 425, 435 (e.g., through air or objects between the information handling system and an access point). In this embodiment, the SAR sensor may be an additional sensor that is operatively coupled to a sensor module within the information handling system 400-1 as described in connection with FIG. 1. In an embodiment, each of the antennas or antenna arrays 405, 410, 425, 430, 435 may also include a SAR sensor to also detect the SAR of the emission of each of the antennas or antenna arrays 405, 410, 425, 430, 435 individually.

In an embodiment, the 5G antennas or antenna arrays 425, 435 may be communicatively coupled to an LTE or 5G RF front end via a multiplexed or separate feed. The 5G antennas or antenna arrays 425, 435 may, in an embodiment, also be configured to transceive at frequencies related to citizens broadband radio service (CBRS) frequencies such as 3.5 GHz LTE or a range of 2 to 4 GHz. In an embodiment, the 5G antennas or antenna arrays 425, 435 may share a portion of the other low-band frequencies with, for example, LTE 4G communications.

In the embodiment shown in FIG. 4A, a plurality of 5G antennas or antenna arrays 430 may be a centimeter-wave (cm-wave) two-dimensional (2D) phased antenna array that emits RF EM waves at a frequency range that includes, for example, a frequency of 28 GHz. In an embodiment, this frequency range may extend from 3 GHz to 30 GHz. In an embodiment, a first 5G antenna 430 may operate in a mid-band frequency range (2.5-3.5 GHz) while another 5G antenna 430 operates in a high-band frequency range (24-39 GHz).

In an embodiment, the information handling system 400-1 may include an array of Wi-Fi antennas 415. The Wi-Fi antennas 415 may operate at frequencies that cover 2.4 GHz and 5 GHz bands in some example embodiments. In an embodiment, the Wi-Fi antennas 415 may operate when it is determined that the other antenna systems within the information handling are not recommended for use.

In an embodiment, the information handling system 400-1 may include a plurality of 5G mm-wave 2D phased antenna arrays 410. In an embodiment, the 5G mm-wave 2D phased antenna arrays 410 may transceive at frequencies from 64 GHz to 71 GHz bands. In some embodiments, the 5G mm-wave 2D phased antenna arrays 410 may operate at any of the (sub-6 GHz) or FR2 (>6 GHz) frequencies. In an embodiment, the 5G mm-wave 2D phased antenna arrays 410 may be implemented at WiGig frequencies of, for example, 60 GHz.

In an embodiment, the information handling system 400-1 may include a GNSS antennas 420. The GNSS antenna 420 may receive location data similar to a GPS sensor described herein. In a specific embodiment, the GNSS antenna 420 may be a GPS antenna. In the embodiment shown in FIG. 4A, the GNSS antenna 420 may be an additional location sensor that provides location data, like the GPS sensor, to the sensor module.

In some embodiments, the information handling system 400-1 may include a Bluetooth antenna 450. The Bluetooth antenna 450 may be used to interface with any other Bluetooth enabled device. In an embodiment, the Bluetooth antenna 450 may operate at a frequency of 2.402 to 2.480 GHz.

As described herein, the antenna performance module may, according to the present description, perform tasks related to measuring the performance parameters of any of the antennas or antenna arrays 405, 410, 425, 430, 435 within the information handling system 400-1 to develop antenna use parameters at, for example, a tracked orientation, configuration, and location of the information handling system 400-1. In an embodiment, the antenna use parameters developed by the antenna performance module are based on the data provided by the sensor module such that the measured antenna performance of any given antenna, at any given frequency, at a specification location within the information handling system 400-1 while the information handling system 400-1 is in a certain orientation. As described herein, some antennas or antenna arrays 405, 410, 425, 430, 435 within the information handling system 400-1 may transceive frequencies in the FR1 and FR2 frequency range. These frequencies are often associated with 5G communications that allow for relatively larger amounts of data being capable of being transmitted from the information handling system 400-1. However, the ability for these frequencies to penetrate surfaces (e.g., a housing of the information handling system 400-1 or objects placed between the information handling system 400-1 and an AP) and a result of the reduced effective radius of the signal as the frequency increases, the ability of some of these antennas or antenna arrays 405, 410, 425, 430, 435 to transmit the signals may be effected by these different locations, orientations, and configurations. As the location, orientation, and configuration of the information handling system 400-1 is tracked by the sensor module, the antenna performance module may select a specific antennas or antenna arrays 405, 410, 425, 430, 435 (e.g., 5G antenna systems, sub-6 GHz antenna systems, WiFi antenna systems, among others) that would best transmit data to, for example, an access point (AP).

Thus, during operation, a sensor module executed by a processor of an information handling system 400-1 may track an orientation, configuration, and location of the information handling system as described in connection with FIG. 4A. Concurrently, the antenna performance module executed by the processor or a controller at one or more wireless interface devices may measure antenna performance parameters associated with any of the antennas or antenna arrays 405, 410, 425, 430, 435 as described in connection with FIG. 5. This is done to train an antenna selection machine learning algorithm executed by an antenna selection machine learning module to generate an antenna system recommendation from among a plurality of antenna systems on the information handling system. The antenna selection machine learning algorithm is trained to correlate these tracked orientations and configurations at locations with antenna system performance parameters for the plurality of antenna systems of the information handling system 400-1 and to determine an optimal antenna system to use. Other factors may also be used as part of the training input according to embodiments herein and may include data usage information about the information handling system such as indications of active application communicating wirelessly on the information handling system. Yet other factors may also be used as part of the training input according to embodiments herein and may include physical environment indicators from sensors of light or time or day.

By using a trained antenna selection machine learning algorithm, the antenna selection machine learning module may receive operating inputs for orientation, configuration, location and others, such as data usage information and physical environment or time of day indications, to generate a recommended antenna system from a plurality of antenna systems deployed on the information handling system. With the antenna selection machine learning recommendation, the information handling system may select an antenna system for setting up a wireless link without having to test the plurality of antenna systems to assess radio quality factors saving energy and time when selecting an antenna system on which to conduct wireless communication. The antenna selection machine learning recommendation may include a prioritized list of the antenna system on the information handling system in some embodiments.

Figure 4B:
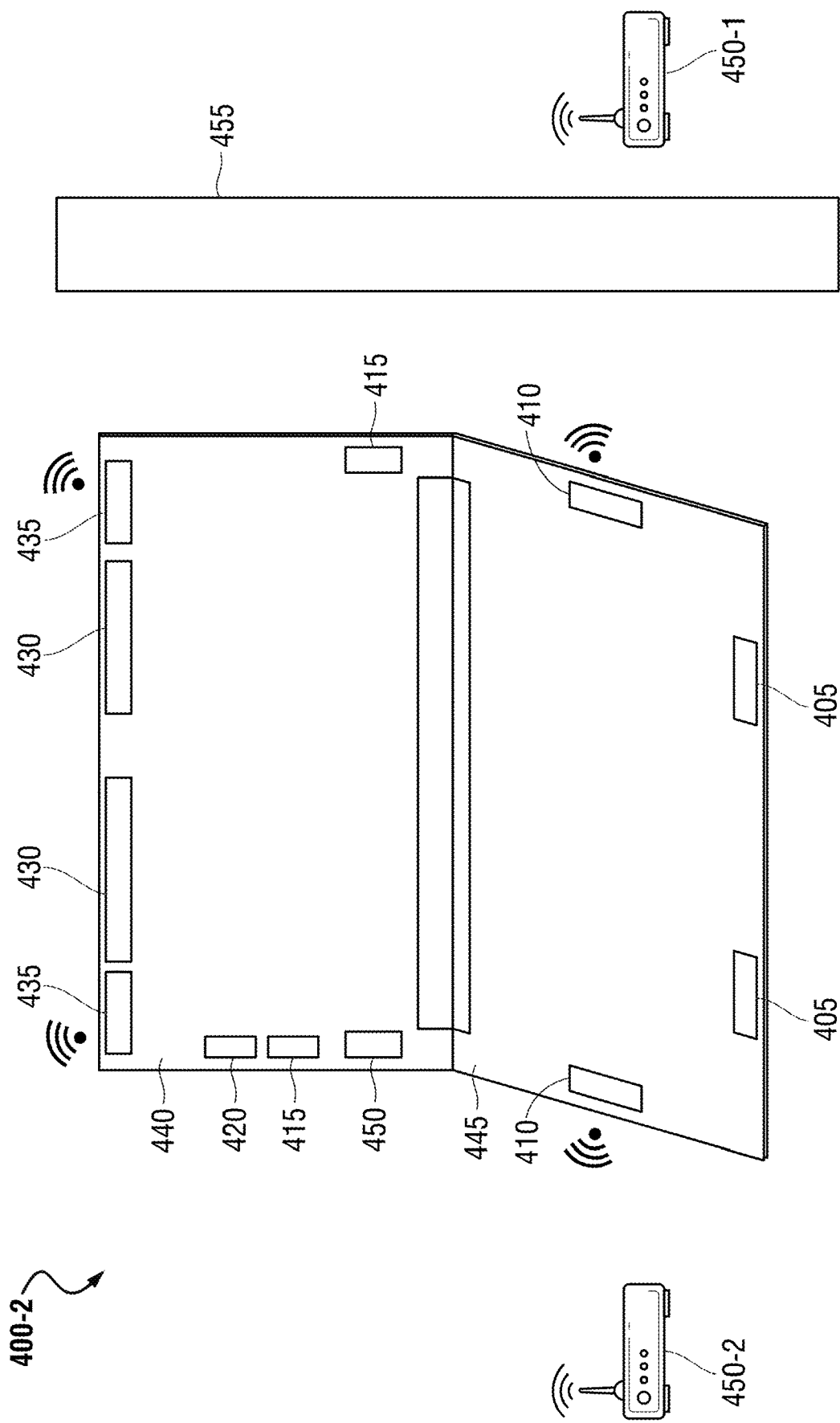
FIG. 4B is a graphical block diagram illustrating an information handling system according to an embodiment of the present disclosure.

FIG. 4B is a graphical block diagram illustrating an information handling system according to an embodiment of the present disclosure. FIG. 4B shows a laptop-type information handling system 400-2. However, the present specification further contemplates that the information handling system 400-2 may be any other type of information handling system such as a dual-screen-type information handling system 400-2. In FIG. 4B the laptop-type information handling system 400-2 includes a display portion 440 and a base portion 445 operatively coupled to each other via a hinge. In a dual-screen-type information handling system 400-2, a first screen portion (e.g., 440) may be coupled to a second screen portion (e.g., 445) via a hinge.

FIG. 4B illustrates potential locations of the array of sub-six GHz antennas and potential locations of the array of mm-wave antennas according to several embodiments described herein. Although, FIG. 4B illustrates specific locations within the information handling system 400-2 of the array of sub-six GHz antennas and array of mm-wave antennas, the present description contemplates that other locations within the information handling system 400-2 are contemplated as locations within the information handling system 400-2 where these arrays may be placed. Additionally, although specific types of antennas are described that transceive data using specific frequencies, the present specification contemplates that any type of antenna may be used to operate at any specific frequency or range of frequencies.

In an embodiment, the information handling system 400-2 may include a number of antennas or antenna arrays 405, 410, 425, 430, 435 placed anywhere within the information handling system 400-2. The antennas or antenna arrays 405, 410, 425, 430, 435 may be located at a bottom edge, side edge, and/or top edge of the information handling system 400-2. In the embodiment shown in FIG. 4B, a plurality of 5G antennas or an array of antennas 405 are placed at a bottom edge of this tablet-type information handling system. In an embodiment, the 5G antennas or antenna arrays 405 may transceive at frequencies at 4 GHz. In an embodiment, the 5G antennas or antenna arrays 405 may transceive at frequencies in the FR1 and FR2 frequency range. In an embodiment, the 5G antennas or antenna arrays 405 may transceive at any of a low-(600 MHz-700 MHz), mid- (2.5-3.5 GHz), and high-band (24-39 GHz) frequency range that extend from 600 Mhz to 39 GHz.

In the embodiment shown in FIG. 4B, 5G antennas or antenna arrays 425, 435 may also be placed at a top edge of the tablet-type information handling system 400-2. The antennas or antenna arrays 425, 435 may transceive at frequencies in the FR1 and FR2 frequency range. In an embodiment, the 5G antennas or antenna arrays 405 may transceive at any of a low- (600 MHz-700 MHz), mid- (2.5-3.5 GHz), and high-band (24-39 GHz) frequency range that extend from 600 Mhz to 39 GHz. In some embodiments, the 5G antennas or antenna arrays 425, 435 may include a specific absorption rate (SAR) sensor to detect the SAR of the emission of these 5G antennas or antenna arrays 425, 435 (e.g., through air or objects between the information handling system and an access point). In this embodiment, the SAR sensor may be an additional sensor that is operatively coupled to a sensor module within the information handling system 400-2 as described in connection with FIG. 1. In an embodiment, each of the antennas or antenna arrays 405, 410, 425, 430, 435 may also include a SAR sensor to also detect the SAR of the emission of each of the antennas or antenna arrays 405, 410, 425, 430, 435 individually.

In an embodiment, the 5G antennas or antenna arrays 425, 435 may be communicatively coupled to an LTE or 5G RF front end via a multiplexed or separate feed. The 5G antennas or antenna arrays 425, 435 may, in an embodiment, also be configured to transceive at frequencies related to citizens broadband radio service (CBRS) frequencies such as 3.5 GHz LTE or a range of 2 to 4 GHz. In an embodiment, the 5G antennas or antenna arrays 425, 435 may share a portion of the other low-band frequencies with, for example, LTE 4G communications.

In the embodiment shown in FIG. 4A, a plurality of 5G antennas or antenna arrays 430 may be a centimeter-wave (cm-wave) two-dimensional (2D) phased antenna array that emits RF EM waves at a frequency range that includes, for example, a frequency of 28 GHz. In an embodiment, this frequency range may extend from 3 GHz to 30 GHz. In an embodiment, a first 5G antenna 430 may operate in a mid-band frequency range (2.5-3.5 GHz) while another 5G antenna 430 operates in a high-band frequency range (24-39 GHz).

In an embodiment, the information handling system 400-1 may include an array of Wi-Fi antennas 415. The Wi-Fi antennas 415 may operate at frequencies that cover 2.4 GHz and 5 GHz bands in some example embodiments. In an embodiment, the Wi-Fi antennas 415 may operate when it is determined that the other antenna systems within the information handling are not recommended for use.

In an embodiment, the information handling system 400-2 may include a plurality of 5G mm-wave 2D phased antenna arrays 410. In an embodiment, the 5G mm-wave 2D phased antenna arrays 410 may transceive at frequencies from 64 GHz to 71 GHz bands. In some embodiments, the 5G mm-wave 2D phased antenna arrays 410 may operate at any of the (sub-6 GHz) or FR2 (>6 GHz) frequencies. In an embodiment, the 5G mm-wave 2D phased antenna arrays 410 may be implemented at WiGig frequencies of, for example, 60 GHz.

In an embodiment, the information handling system 400-2 may include a GNSS antennas 420. The GNSS antenna 420 may receive location data similar to a GPS sensor described herein. In a specific embodiment, the GNSS antenna 420 may be a GPS antenna. In the embodiment shown in FIG. 4A, the GNSS antenna 420 may be an additional location sensor that provides location data, like the GPS sensor, to the sensor module.

In some embodiments, the information handling system 400-2 may include a Bluetooth antenna 450. The Bluetooth antenna 450 may be used to interface with any other Bluetooth enabled device. In an embodiment, the Bluetooth antenna 450 may operate at a frequency of 2.402 to 2.480 GHz.

As described herein, the antenna performance module may, according to the present description, perform tasks related to measuring the performance parameters of any of the antennas or antenna arrays 405, 410, 425, 430, 435 within the information handling system 400-2 to develop antenna use parameters at, for example, a tracked orientation, configuration, and location of the information handling system 400-2. In an embodiment, the antenna use parameters developed by the antenna performance module are based on the data provided by the sensor module such that the measured antenna performance of any given antenna, at any given frequency, at a specification location within the information handling system 400-2 while the information handling system 400-2 is in a certain orientation. As described herein, some antennas or antenna arrays 405, 410, 425, 430, 435 systems within the information handling system 400-2 may transceive frequencies in the FR1 and FR2 frequency range. These frequencies are often associated with 5G communications that allow for relatively larger amounts of data being capable of being transmitted from the information handling system 400-2. However, the ability for these frequencies to penetrate surfaces (e.g., a housing of the information handling system 400-2 or objects placed between the information handling system 400-2 and an AP) and a result of the reduced effective radius of the signal as the frequency increases, the ability of some of these antennas or antenna arrays 405, 410, 425, 430, 435 to transmit the signals may be effected by these different locations, orientations, and configurations. As the location, orientation, and configuration of the information handling system 400-2 is tracked by the sensor module, the antenna performance module may select a specific antennas or antenna arrays 405, 410, 425, 430, 435 (e.g., 5G antenna systems, sub-6 GHz antenna systems, WiFi antenna systems, among others) that would best transmit data to, for example, an access point (AP).

Thus, during operation, a sensor module executed by a processor of an information handling system 400-2 may track an orientation, configuration, and location of the information handling system as described in connection with FIG. 4B. Concurrently, the antenna performance module executed by the processor may measuring antenna performance parameters associated with any of the antennas or antenna arrays 405, 410, 425, 430, 435 as described in connection with FIG. 5. This is done to develop a number of antenna use parameters at these tracked orientations, configurations, and locations of the information handling system 400-2. In a specific embodiment shown in FIG. 4B, the sensors of the sensor module may detect that this laptop-type information handling system 400-2 is in a "laptop orientation" as described in connection with FIG. 3, for example. In this configuration, the antennas or antenna arrays 405, 410, 425, 430, 435 may or may not be in optimal location to transceive data to and from an access point 450-1, 450-2. For example, the antenna performance module or a sensor (e.g., IR light or camera) may detect that a wall 455 is between the information handling system 400-2 and a first access point 450-1. This data may be presented to the antenna selection machine learning module as training data used to help develop the antenna selection machine learning algorithm used by the antenna selection machine learning module to provide recommendations. In embodiments where the antenna selection machine learning module has been trained sufficiently, orientation, configuration, and location data may also be used as operating input to cause the antenna selection machine learning module to generate those recommendations. In this embodiment, the data may be used to further refine the recommendations to the user descriptive of which of the antennas or antenna arrays 405, 410, 425, 430, 435 to use to transceive data and which among a plurality of access points 450-1, 450-2 to communicate with. Where another antennas or antenna arrays 405, 410, 425, 430, 435 is recommended, the processor of the information handling system may be directed to implement a different antennas or antenna arrays 405, 410, 425, 430, 435 and possibly attempt to operatively couple the information handling system 400-2 to a second access point 450-2 that is within a line-of-sight of the information handling system 400-2.

It is also appreciated that the orientation of the information handling system 400-2 (e.g., laptop orientation) may reduce the ability of any given antennas or antenna arrays 405, 410, 425, 430, 435 to transceive data to, for example, the second access point 450-2 as shown. In FIG. 4B the 5G antennas or antenna arrays 425, 435 have been placed at the top edge of the display portion 440 of the information handling system 400-2. In this embodiment, the second access point 450-2 may or may not be within line of sight of the 5G antennas or antenna arrays 425, 435 and instead, the signal from the 5G antennas or antenna arrays 425, 435 may have to travel through a portion of the display portion 440 in order to reach the second access point 450-2. Again, because mm-wave signals can have serious dropout issues between AP locations based on an orientation of the information handling system and any intervening structures including portions of the information handling system itself, the selection of the 5G antennas or antenna arrays 425, 435 may not be optimal for transceiving data. The data from the antenna performance module may be used by the machine learning module to train the machine learning module and provide a refined recommendation as to which of the antennas or antenna arrays 405, 410, 425, 430, 435 would be best to transceive data under the operating conditions of the information handling system 400-2 as described herein. As the location, orientation, and configuration of the information handling system 400-2, the machine learning module may adjust the use of any of the antennas or antenna arrays 405, 410, 425, 430, 435 as needed according to the training of the machine learning module.

Thus, during operation, a sensor module executed by a processor of an information handling system 400-1 may track an orientation, configuration, and location of the information handling system as described in connection with FIG. 4A. Concurrently, the antenna performance module executed by the processor or a controller at one or more wireless interface devices may measure antenna performance parameters associated with any of the antennas or antenna arrays 405, 410, 425, 430, 435 as described in connection with FIG. 5. This is done to train an antenna selection machine learning algorithm executed by an antenna selection machine learning module to generate an antenna system recommendation from among a plurality of antenna systems on the information handling system. The antenna selection machine learning algorithm is trained to correlate these tracked orientations and configurations at locations with antenna system performance parameters for the plurality of antenna systems of the information handling system 400-2 and to determine an optimal antenna system to use. Other factors may also be used as part of the training input according to embodiments herein and may include data usage information about the information handling system such as indications of active application communicating wirelessly on the information handling system. Yet other factors may also be used as part of the training input according to embodiments herein and may include physical environment indicators from sensors of light or time of day, day of the week or other indicators of where or how the information handling system may be used.

By using a trained antenna selection machine learning algorithm, the antenna selection machine learning module may receive operating inputs for orientation, configuration, location and others, such as data usage information and physical environment or time of day indications, to generate a recommended antenna system from a plurality of antenna systems deployed on the information handling system. With the antenna selection machine learning recommendation, the information handling system may select an antenna system for setting up a wireless link without having to test the plurality of antenna systems to assess radio quality factors saving energy and time when selecting an antenna system on which to conduct wireless communication. The antenna selection machine learning recommendation may include a prioritized list of the antenna system on the information handling system in some embodiments. The training and operational use of the antenna selection machine learning module to generate one or more antenna system recommendations is discussed in more detail herein.

Figure 5:
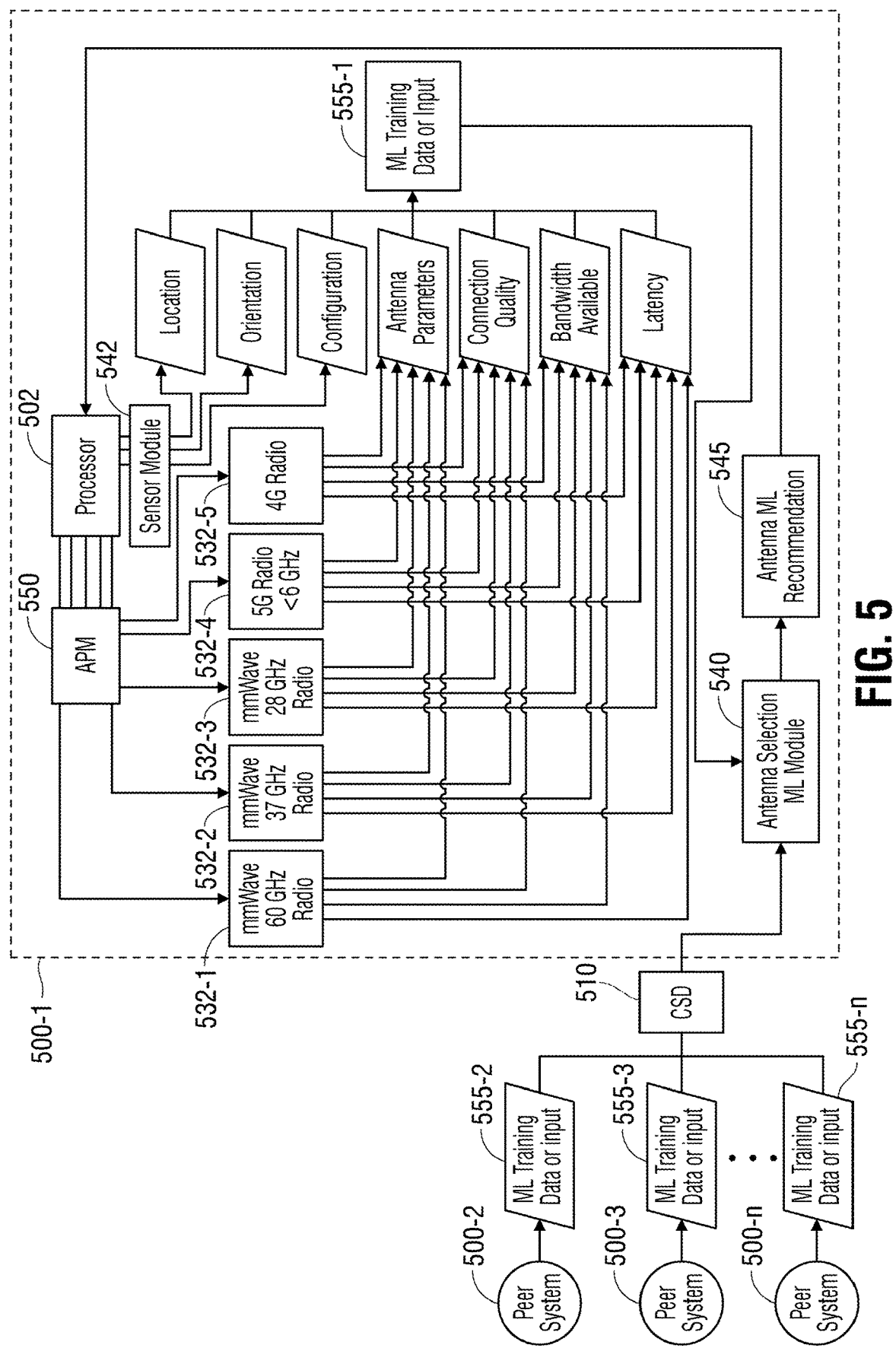
FIG. 5 is a block diagram illustrating an information handling system according to an embodiment of the present disclosure.

FIG. 5 is a block diagram illustrating an information handling system 500-1 executing instructions of antenna selection machine learning (ML) module 540 for generating an antenna selection machine learned (ML) antenna ML recommendation 545 according to an embodiment of the present disclosure. The information handling system may utilize plural training inputs to train the antenna selection machine learning (ML) module 540 including measurements of antenna performance parameters with an antenna performance module 550 as well as location, orientation, and configuration data developed by a sensor module 542 from a plurality of sensors. Other training data inputs may be received according to embodiments herein as well. In an example embodiment, the information handling system 500-1 may be operatively coupled to a crowd sourcing database 510 via a wired connection or via a wireless connection using one of the antenna systems 532-1, 532-2, 532-3, 532-4, 532-5. In such an embodiment, the information handling system 500-1 may have downloaded information from the crowd sourcing database 510 to provide additional training data to train the antenna selection ML module 540 from remote information handling systems 500-2, 500-3, and 500-n that may have one or more similarities per the methods described herein. For example, the remote information handling systems 500-2, 500-3, and 500-n may have similar radios deployed, may have possible configurations or similar application operating, may operate in various similar locations, or have other similarities to information handling system 500-1 such that antenna performance parameters, and other training input data may be similar enough to be used to train the antenna selection ML module 540.

The information handling system 500-1 includes a processor 502 that directs a sensor module 542 to perform tasks related to tracking an orientation, configuration, and location of the information handling system 500-1 at any given time. In some embodiments, the sensor module 542 may receive input from any number of sensors and organize the data from that input in order to track the orientation, configuration, and location of the information handling system 500-1. These sensors may include an accelerometer, a SAR sensor, a global positioning satellite (GPS) sensor, an orientation sensor, a hall effect sensor, a light (e.g., IR) sensor, a proximity sensor, a hinge sensor, a magnetometer, a WiFi triangulation sensor, and a camera. Each of these sensors may provide data to the sensor module 542 that may take one or more forms in order to describe the orientation, configuration, and location of the information handling system 500-1 in a three-dimensional space. Additionally, each of the sensors may provide data to the sensor module 542 that may take one or more forms to described the orientation, configuration, and location of the information handling system 500-1 relative to AP locations accessible to the information handling system 500-1. In an example, the sensor module 542 may be provided with data descriptive of the physical location of the antenna systems 532-1, 532-2, 532-3, 532-4, 532-5 within the information handling system 500-1 or, alternatively, sensors may provide data to the sensor module 542 descriptive of the locations of these antenna systems 532-1, 532-2, 532-3, 532-4, 532-5.

For example, the accelerometer may determine whether the information handling system 500-1 or portions thereof are moving or being oriented a certain way. Thus, in an embodiment, the accelerometer may provide data to the sensor module 542 descriptive of the orientation and configuration of the information handling system 500-1. The GPS sensor, a GNSS satellite navigation system, a WiFi triangulation sensor, or other wireless location sensor may provide data to the sensor module 542 descriptive of the position of the information handling system 500-1 on the earth as well as the location of the information handling system 500-1 relative to, for example, an access point in an embodiment. The orientation sensor may, through a variety of sensors placed within the information handling system 500-1, detect the orientation of the information handling system 500-1 such as a tablet configuration, a dual tablet configuration, a laptop configuration, a tent mode configuration, a book configuration, as well as several other configurations described herein. Because the orientation of the information handling system 500-1 may affect any antenna systems' 532-1, 532-2, 532-3, 532-4, 532-5 ability to transceive data at a specific frequency, the orientation sensor may indicate to the sensor module 542 what orientation that the information handling system 500-1 is in. The SAR sensor may detect the specific absorption rate of a frequency signal transceived by any of the antenna systems 532-1, 532-2, 532-3, 532-4, 532-5.

The processor 502 may also direct an antenna performance module (APM) 550 to, as described herein, perform tasks related to measuring antenna performance parameters to develop antenna use parameters at a tracked orientation, configuration, and location of the information handling system. The measured antenna performance parameters may include any QoS parameters such as RSSI parameters, bandwidth parameters, latency parameters, and quality of signal parameters at an antenna system 532-1, 532-2, 532-3, 532-4, 532-5 within the information handling system 500-1 as shown in FIG. 5. Additional QoS parameters may include any characteristics associated with a link quality between any of the antenna systems 532-1, 532-2, 532-3, 532-4, 532-5 of the information handling system 500-1 and the access points that have been historically detected. These characteristics in QoS include a received signal strength indicator (RSSI), bandwidth, gain, bit error rate (BER), beamforming angles (angle of attack or angle of departure for antenna array directionality), connection quality, and signal strength among other QoS characteristics. The APM 550 may also measure antenna performance parameters that are independent of the antenna systems 532-1, 532-2, 532-3, 532-4, 532-5 and instead describe the characteristics of the quality of service (QoS) related to the access points to which the information handling system 500-1 is communicatively coupled to a network. In an embodiment, the information handling system 500-1 may store data regarding this QoS data in the form of historic data indicating which of a specific number of access points provide the best QoS for each of the antenna systems 532. This QoS historic data may be stored on, for example, static memory (e.g., 106 of FIG. 1), a database, or any other storage device associated with the information handling system 500-1. During operation, the data generated by the sensor module 542 and APM 550 may be used as machine learning training data 555-1 to train an antenna selection ML module 540.

In some embodiments, the antenna selection ML module 540 may also receive additional training input data related to antenna use parameters associated with a plurality of remote information handling systems 500-2, 500-3, 500-*n*. For example, remote information handling systems 500-2, 500-3, 500-*n* may have similar radios, be similar information handling system types, have similar configurations or radio layouts, or may gather information on radio systems operating in particular locations. These remote information handling systems 500-2, 500-3, 500-*n* along with the information handling system 500-1 described herein may each be communicatively coupled to the crowd sourcing database 510 with each of the information handling system 500-1 and remote information handling systems 500-2, 500-3, 500-*n* providing their respective antenna use parameters, including antenna types, antenna performance parameters, locations, orientations, configurations, operating applications or the like to this crowd sourcing database 510 to which the information handling system 500-1 and specifically the antenna selection ML module 540 gains access to for additional training input data. Depending on similarity of reporting remote information handling systems 500-2, 500-3, 500-*n*, this crowd-sourced training input data may be given various levels of weighting depending on similarities. For example, data from an identical system model with identical radios to information handling system 500-1, may be weighted high compared to a remote information handling system with different radio layout or different available configurations or orientations.

As the antenna selection ML module 540 gains access to the crowd sourcing database 510, the antenna selection ML module 540 also receives and incorporates the crowd-sourced parameters descriptive of antenna performance parameters associated with the plurality of the remote information handling systems 500-2, 500-3, 500-*n* to, with the developed antenna use parameters from the APM 550 and the sensor module 542 to train the antenna selection module to provide a recommended antenna system or a prioritized list of antenna recommendations in the form of an antenna selection ML recommendation 545. Training the antenna selection ML module 540 to generate antenna selection ML recommendations 545 enables these to be used to communicatively couple the information handling system 500-1 to a network without having to activate the plurality of deployed antennas to test for wireless signal quality and may save energy and time. In some embodiments, similar types of information handling systems as that of the information handling system 500-1 shown may also crowdsource orientation, configuration, and location data. For example, an enterprise administration may manage several Dell® Latitude® notebooks that include an antenna selection ML module for recommending among antenna systems on that specific model. In these examples, the antenna use parameters associated with these similar models of information handling systems may, for example, be provided more weight during the training process conducted by the antenna selection ML module 540.

Again, the antenna selection ML module 540 may use these new antenna use parameters from the crowd sourcing database as input in order to further train and refine the antenna selection ML module 540 to generate the prioritized list of antenna selection ML recommendations 545. In an embodiment, each of remote information handling systems 500-2, 500-3, 500-*n* may also include a sensor module and antenna performance module, and even an antenna selection machine learning module similar to that included within the information handling system 500-1. Each of these remote information handling systems 500-2, 500-3, 500-*n* may, with a sensor module executed by a processor, track an orientation, configuration, and location of the remote information handling systems 500-2, 500-3, 500-*n* and, with an antenna performance module executed by the processor, measure antenna performance parameters to provide crowdsourced machine learning input data 555-2, 555-3, 555-*n* to be stored on the crowd sourcing database 510 as antenna use parameters.

During operation of the antenna selection ML module 540, such data from the sensor module 542 among other operating input data may also be input into a trained antenna selection ML module 540 to generate an antenna selection ML recommendation 545. The antenna selection ML module 540 may execute any type of machine learning process in order to, over time, learn which antenna systems 532-1, 532-2, 532-3, 532-4, 532-5, wireless protocols, and frequencies has the best performance in light of each of the QoS parameters, orientation, direction, configuration, and location of the information handling system 500-1.

In an embodiment, the antenna selection machine learning module 540 receives as operating input the location, orientation, and configuration data of the information handling system 500-1. The location, orientation, and configuration data of the information handling system 500-1 may be received by the antenna selection ML module 540 from the sensor module 542 as described herein. The antenna selection ML module 540 may execute any machine learning classifier (e.g., multilevel classifier) or other deep learning supervised or unsupervised learning process to provide a recommendation as to which of the antenna systems 532-1, 532-2, 532-3, 532-4, 532-5 should be used based on the location, orientation, and configuration data of the information handling system 500-1 and the historical antenna use parameters used to train the antenna selection machine learning algorithm developed as described herein. The trained antenna selection ML module may provide one or more recommended antennas to be used. In another embodiment, the antenna selection ML module 540 may provide a prioritized list of antenna recommendations to be used to communicatively couple the information handling system to a network. The antenna selection ML module 540 may also receive, as further training input, the connection quality, available bandwidth, end-to-end latency, antenna parameters measured for a currently selected antenna system of set of antenna systems among 532-1, 532-2, 532-3, 532-4, 532-5, and any other associated QoS metric detected by the information handling system 500-1 during operation of the recommended antenna or antennas. The feedback training data regarding the recommended antenna system may be used to confirm or adjust the function of the antenna selection ML module 540 as further training input.

During further operation of the information handling system 500-1, the processor 502 may select a first recommendation from the prioritized list of antenna recommendations, operate a first antenna used to propagate a frequency associated with the first recommendation from the prioritized list of antenna recommendations to operatively couple the information handling system to the network. In one example embodiment, the antenna may be selected from one or more of a mm-wave 60 GHz antenna, a mm-wave 37 GHz antenna, a mm-wave 28 GHz antenna, a 5G sub-6 GHz antenna, a 4G antenna, a WiFi antenna, among others. Each of these antennas may transceive at their respective frequencies based on the recommendations provided by the antenna selection machine learning module 540. This process allows for the use of the highest quality frequency signal to transmit data as correlated and weighed by the antenna selection ML module 540 against the ability of that signal to reach an access point depending on orientation, location and configuration of the information handling system.

In an embodiment and during operation of the information handling system 500-1, the user may carry the information handling system 500-1 into an area not previously visited by the user or in which the information handling system 500-1 has been communicatively coupled to an AP. In this embodiment, the antenna selection ML module 540 has not generated any antenna use parameters associated with the information handling system 500-1 accessing any AP in the area. As such, although the sensor module 542 executed by a processor 502 has tracked an orientation, configuration, and location of the information handling system 500-1, any antenna performance data has not been measured by the antenna performance module 550 for one or more antenna systems 532-1, 532-2, 532-3, 532-4, 532-5. In this embodiment, the antenna selection ML module 540 may rely on the crowd sourced machine learning training data from the plurality of remote information handling systems 500-2, 500-3, 500-*n* to train antenna selection ML module 540 to provide the prioritized list of antenna recommendations to be used to communicatively couple the information handling system 500-1 to a network. In this embodiment further, the location, orientation, and configuration data gathered by the remote information handling systems may be used by the antenna selection ML module 540 to generate the prioritized list.

The antenna selection ML module 540 and its operation within the information handling system 500-1 utilizes training data or crowd source data to specifically allow the information handling system 500-1 to attempt to communicatively couple an antenna system 532-1, 532-2, 532-3, 532-4, 532-5 to an AP using a first recommendation presented or to utilize a prioritized list of antenna recommendations instead of activating, one-by-one, each of the remote information handling systems 500-2, 500-3, 500-*n* in order to attempt to communicatively couple the information handling system 500-1 to an AP and the network. This process reduces the amount of time taken to establish the communication between the AP and the information handling system 500-1. Additionally, the process reduces the power consumed by the information handling system 500-1 by reducing the number of potential antenna systems 532-1, 532-2, 532-3, 532-4, 532-5 activated. Still further, this process executed by the information handling system 500-1 provides for the activation of an optimized antenna system among deployed antenna systems 532-1, 532-2, 532-3, 532-4, 532-5 to be used to communicate with the network. This optimized antenna from the antenna systems 532-1, 532-2, 532-3, 532-4, 532-5 may be selected based on the ability of a selected antenna system 532-1, 532-2, 532-3, 532-4 or 532-5 to quickly transmit large amounts of data while also maintaining communication with the AP and network due to a relatively stable signal quality. In this way, with the use of location, orientation, and configuration data of the information handling system 500-1, the information handling system 500-1 may be input into a trained antenna selection ML module 540 to select an antenna system to best communicate with the network.

In an embodiment and during operation of the information handling system 500-1, the user may carry the information handling system 500-1 into an area previously visited by the user or in which the information handling system 500-1 had been communicatively coupled to an AP within the area. In this embodiment, the antenna selection ML module 540 may access location, orientation, and configuration data of the information handling system 500-1 to determine that the area has been visited before by reviewing a history of location data maintained on a data storage device of the information handling system 500-1. In this embodiment, the antenna selection ML module 540 may use this location, orientation, and configuration data of the information handling system 500-1 as well as those historic antenna use parameters, including previous antenna performance parameters, maintained on the data storage device as input to a trained antenna machine learning process executed by the antenna selection ML module 540. Additional input to the antenna selection ML module 540 may be received by the information handling system 500-1 from a crowd sourcing database 510 as described herein. Again, this process specifically allows the information handling system 500-1 to communicatively couple on of the antenna systems 532-1, 532-2, 532-3, 532-4, 532-5 to an AP using a recommendation presented or a prioritized list of antenna recommendations instead of activating, one-by-one, each of the antenna systems 532-1, 532-2, 532-3, 532-4, 532-5 in order to test and compare before selecting an antenna to communicatively couple the information handling system 500-1 to an AP and the network. This process reduces the amount of time taken to establish the communication between the AP and the information handling system 500-1. Additionally, the process reduces the power consumed by the information handling system 500-1 by reducing the number of potential antenna systems 532-1, 532-2, 532-3, 532-4, 532-5 activated. Still further, this process executed by the information handling system 500-1 provides for the activation of the most beneficial antenna system 532-1, 532-2, 532-3, 532-4, 532-5 to be used to communicate with the network.

Figure 6:
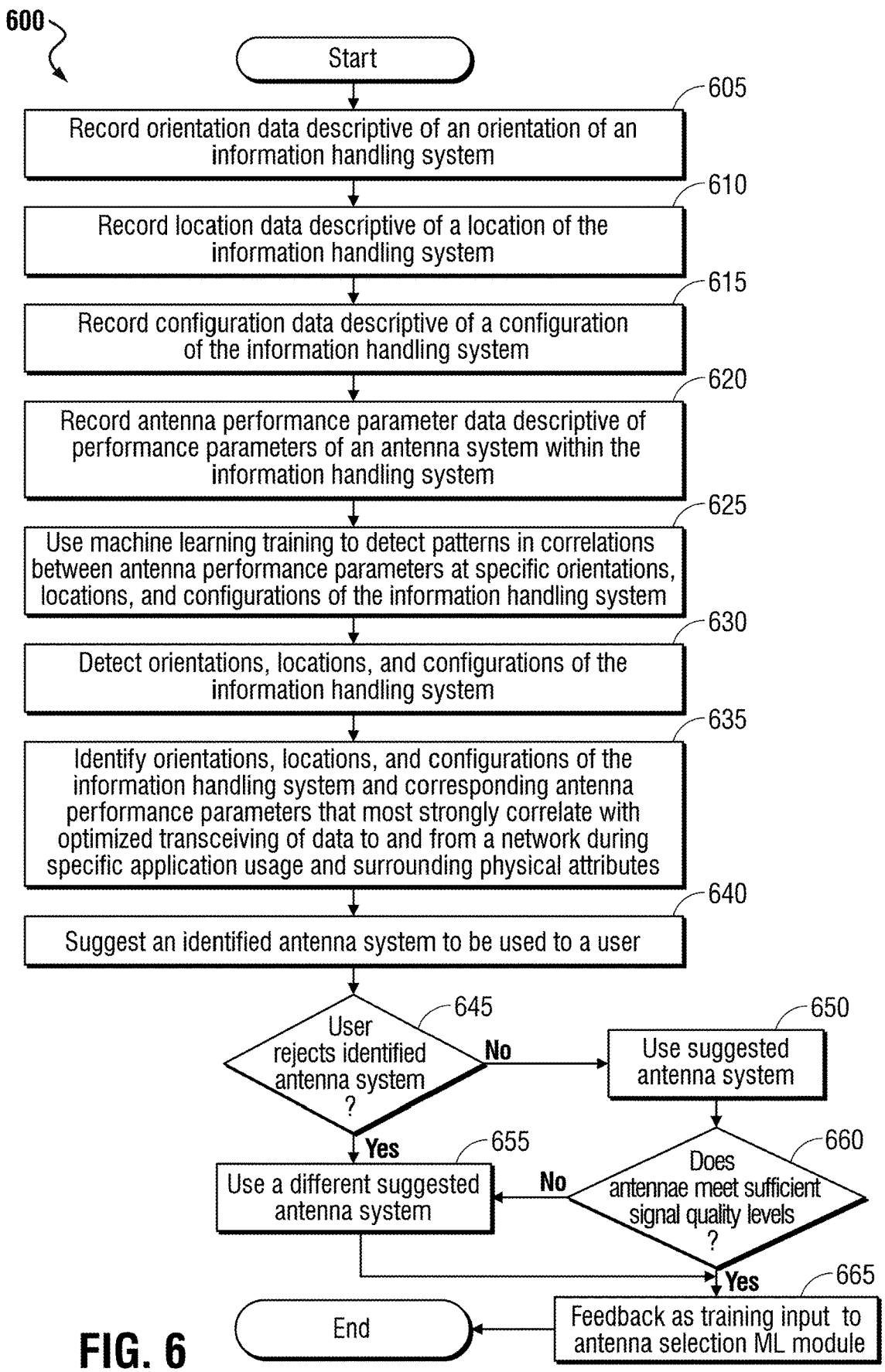
FIG. 6 is a flow diagram illustrating a method of developing a prioritized list of antenna recommendations to be used to communicatively couple an information handling system to a network according to an embodiment of the present disclosure.

FIG. 6 is a flow diagram illustrating a method of developing an antenna recommendation or a prioritized list of antenna recommendations to be used to communicatively couple the information handling system to a network according to an embodiment of the present disclosure. The method 600 may begin with recording orientation data of the information handling system at block 605. The orientation data may be sensed by one or more of the sensors described herein such as the orientation sensor that implements, for example, an accelerometer, a magnetometer, and a camera. This orientation data may describe the orientation of the information handling system within any three-dimensional space. The orientation data may be descriptive of an orientation of the information handling system relative to known access points in some embodiments. In an embodiment, the orientation data may be accumulated at a sensor module such as a sensor hub (e.g., sensor module in FIG. 1) that receives sensor data from a plurality of sensors.

The method 600 may further include, at block 610, with recording location data descriptive of a location of the information handling system. The location data may be detected using a number of sensors such as a GPS sensor and a WiFi triangulation sensor, among other types of sensors as described herein. Again, this data may be provided by the sensor module described herein which may accumulate this data and provide it to an antenna selection machine learning module.

The method 600, at block 615, includes recording configuration data descriptive of the configuration of the information handling system. The configuration data descriptive of the configuration of the information handling system describes relative positions of portions of the information handling system to one another. Recording the configuration data may be done via the use of, for example, a hall effect sensor, a light sensor, a camera, a hinge sensor, and a proximity sensor, among others. For example, the configuration of a laptop-type or dual-screen-type information handling system may be one of a tablet configuration, a dual tablet configuration, a laptop configuration, a tent mode configuration, a book configuration, as well as several other configurations described herein and in connection with FIG. 3 for example. This data may be provided by the sensor module described herein to accumulate this data. This configuration data may be provided it to the antenna selection machine learning module.

The method 600 may also include recording antenna performance parameter data descriptive of performance parameters of an antenna system within the information handling system at block 620. Again, this may be done via an antenna performance module of a wireless interface device that measures antenna performance of any given antenna within the information handling system, at any given frequency, oriented in any direction, with an any angle of attack or directionality of the signal while the information handling system is in a certain configuration.

Some antenna systems within the information handling system may transceive frequencies in the FR1 and FR2 frequency range. These frequencies are often associated with 5G communications that allow for relatively larger amounts of data being capable of being transmitted from the information handling system. However, the ability for these frequencies to penetrate surfaces (e.g., a housing of the information handling system) and a result of the reduced effective radius of the signal as the frequency increases, the ability of some of these antenna systems to transmit the signals may be effected by these different locations, orientations, and configurations. As the location, orientation, and configuration of the information handling system is tracked by the sensor module, the antenna performance module may select a specific antenna system (e.g., 5G antenna systems, sub-6 GHz antenna systems, WiFi antenna systems, among others) that would best transmit data to, for example, an access point (AP).

In some specific embodiments, the antenna performance module may further measure antenna performance parameters of the antenna systems that describe the characteristics of the quality of service (QoS) for wireless links to the access points to which the information handling system is communicatively coupled to a network. This QoS may include any characteristics associated with a link quality between any of the antenna systems of the information handling system and the access points that have been historically detected. These characteristics in QoS include a received signal strength indicator (RSSI), bit error rate, latency, congestion, drops, bandwidth, and signal strength among other quality metrics. In an embodiment, the information handling system may store data regarding this QoS data in the form of historic data indicating which of a specific number of access points provide the best QoS for each of the antenna systems. This QoS historic data may be stored on, for example, a database on any other storage device associated with the information handling system or crowd sourced database.

The method 600 may, at block 620, continue with using machine learning to detect patterns in correlations between antenna performance parameters at specific orientations, locations, and configurations of the information handling system. The antenna selection machine learning module in an embodiment may determine such correlations in an embodiment based on any machine learning or neural network methodology known in the art or developed in the future. For example, the antenna selection machine learning module in an embodiment may model the relationships between each of the orientation of the information handling system, configuration of the information handling system, location of the information handling system, measured antenna performance parameters, and application usage data using a layered neural network topology. Such a neural network in an embodiment may include an input layer (e.g., location, orientation, configuration, antenna parameters, connection quality, bandwidth availability, and latency shown in FIG. 5) including a known, recorded set of values for each of these parameters, settings, indicators, and usage data metrics, and an output layer including a projected optimal set of values for each of the antenna use recommendations, based on the known, recorded set of values in the input layer. The antenna selection machine learning module in an embodiment may propagate input through the layers of the neural network to project or predict optimal antenna use parameters based on the known and recorded parameters, settings, indicators, and usage data metrics, and compare these projected values to user-selected optimal antenna use parameters. Using a back-propagation method, the antenna selection machine learning module in an embodiment may then use the difference between the projected values and the known optimal values to adjust weight matrices of the neural network describing the ways in which changes in each of the parameters, settings, indicators, and usage data metrics are likely to affect each of the optimal antenna use parameters. With the output layer, the information handling system may provide learned, custom antenna use parameters that are determined to be optimal antenna use parameter settings for the user based on the user-defined antenna use parameters if any have been designated and based upon the antenna performance parameters detected during use of the information handling system. These resulting learned, custom antenna performance parameters may be suggested to a user or automatically implemented. Suggestion may come with an indicator and be shown in a graphic user interface for approval by the user before implementation. In some embodiments, the antenna use parameters may include further combinations of antenna use parameters physical surrounding indicators or application data usage indicating what types of applications are operating to determine via the antenna selection machine learning algorithm one or more optimized antenna recommendations. For example, the antenna use parameters may include one set of learned, custom antenna use parameters when physical environmental indicators indicate daytime, or working hours while a different set of learned, custom antenna use parameters may be used for evening information handling system usage. Combinations of physical surrounding indicators and application usage data indicating applications operating may adjust or change the learned, custom antenna use parameters implemented from a personal antenna use parameter in various embodiments. By way of example, where an application being executed on the information handling system does not require high bandwidth such as an email application, these learned custom antenna use parameters may impact optimal antenna recommendations. In another example, if a high-bandwidth, low latency application is being executed on the information handling system such as an internet gaming application these learned custom antenna use parameters may also impact optimal antenna recommendations.

The antenna selection machine learning module in an embodiment may perform this forward propagation and backward propagation, using different input node values repeatedly to finely tune the weight matrices. In such a way, the antenna selection machine learning module in an embodiment may adaptively learn how changes in these wireless signal parameters, location, orientation, configuration, system settings, indicators, and data usage metrics may affect an information handling system's optimal antenna use parameters. The weight matrices associated with the layers of the neural network model in such an embodiment may describe, mathematically, these correlations for an individual user. The neural network model (including designation of the node values in the input layer, and number of layers), along with the weight matrices associated with each layer in an embodiment may form a trained machine learning classifier to be used.

At block 625, the information handling system may detect the orientation, location, and configuration of the information handling system for use in a trained antenna selection machine learning algorithm. For example, the antenna selection machine learning module applies a trained machine learning algorithm methodology to develop one or more antenna recommendations among the deployed antenna systems in the information handling system. In some embodiments, the information handling system may detect changes to any of these influencing factors or the antenna performance parameters, and notify the antenna selection machine learning module to re-suggest an antenna selection recommendation. The antenna selection machine learning module may respond by either suggesting or automatically applying changes to one or more of the factors controlling a determination of the antenna recommendations. For example, the sensor module (142 of FIG. 1) and antenna performance module (e.g., 164 of FIG. 1), in an embodiment, may continuously monitor incoming sensed changes in orientation, location, configuration and notify the antenna selection machine learning module that then determines when one of these factors warrants a change to the recommendation resulting from a previous application of input parameters to the trained antenna selection machine learning module. This is also discussed further in block 655 during operation of the information handling system. The recommendation custom antenna use profiles may be compared for various antennas on the information handling system to determine one or more recommended antennas for wireless communications. The recommendation may include the learned aspects based on the input parameters that results from application of the trained antenna selection machine learning algorithm in embodiments herein.

At block 630, the antenna selection machine learning module may input the orientation, location, and configuration, application types, physical surroundings indicators, or other factors into a trained antenna selection machine learning module to determine which of the information handling system antenna systems most strongly correlates to optimal antenna performance parameters in an embodiment at block 625. For example, the antenna selection machine learning module system may input the newly recorded or altered orientations, locations, and configurations of the information handling system, the physical surroundings indicators, and application data usage to the input layer of the trained neural network in the antenna selection machine learning module, and forward propagate to identify projected optimal antenna recommendations or ratings in the output layer. The output (e.g., projected optimal antenna system rating or expected signal levels) in an embodiment may be determined based on the weight matrices unique to the individual information handling system user, thus producing optimal personalized recommendation.

At block 630, the information handling system output of the trained antenna selection machine learning module may identify, based on an orientation, location, or configuration of the information handling system, the corresponding antenna performance parameters of the antenna systems that most strongly correlate with optimized transceiving of data to and from a network during specific application usage and surrounding physical attributes. For example, the antenna selection machine learning module may transmit the projected optimal antenna system recommendation to the information handling system determined through forward propagation of the trained neural network or other machine learning algorithm described with respect to blocks 605-630.

At block 635, the machine learning generated antenna selection machine learning recommendation may be presented to a user via a GUI in one optional embodiment. The GUI, in some embodiments may display the suggested antenna recommendation or a list of recommendations, and allow the user to choose whether to apply such suggested recommendations or to decline such recommendations. In some embodiments, the information handling system may notify the user a change to a recommended antenna system will occur automatically or unless the user declines such a change during a preset duration of time. In other embodiments, the information handling system may automatically apply the changes, without notifying the user.

The information handling system may determine at block 640 in an embodiment whether the user has rejected the suggested antenna recommendation. For example, in an embodiment in which the information handling system displays the one or more suggested recommendations, the user may decline to change to a selected antenna via a graphical user interface. Flow may then proceed to block 650 to utilize a different antenna system. Such a rejection may be stored and fed back to the antenna selection machine learning algorithm as training inputs to further refine the antenna selection machine learning module such as at block 660. When the user has accepted an antenna selection ML recommended antenna suggestion, flow may proceed to block 645. In such a case, an accepted antenna selection ML recommendation may be stored and fed back to the antenna selection machine learning algorithm as training inputs to confirm the recommendation and further refine the antenna selection machine learning module such as at block 660. In yet another embodiment, in which the information handling system automatically initiates the use of the recommended antenna without notifying the user, the flow may proceed directly to block 645. In some embodiments, a user may readjust the antenna selected with an antenna selection interface, for example. The information handling system may record data of the readjustment as a rejection of the automatically applied antenna recommendation.

If the user rejects the suggested recommendation or automatically instated adjustment to the antenna system selection, this suggests the current neural network model does not accurately gauge optimal antenna use parameters for the information handling system in the current situation. The method may proceed to block 650 for adjustment of the antenna system to a different recommended antenna system if more than one is presented as described or a default or other selected antenna system in other embodiments. The different selected antenna system may be used by a wireless interface device to create a wireless link with an access point for wireless data communication.

If the user does not reject the suggested or the applied antenna recommendation automatically applied, this suggests the current neural network model accurately gauges optimal antenna use parameter for the information handling system in the current situation. The method may proceed to block 645 with using the machine learning recommended antenna system. The recommended antenna system may be used by a wireless interface device to create a wireless link with an access point for wireless data communication. Acceptance or rejection may be fed back into the antenna selection machine learning algorithm as training data to refine the antenna selection ML algorithm such as shown at block 660.

The method 600 may continue with the information handling system connecting to a network using the recommended antenna at 650, the antenna performance module of a wireless interface device may determine antenna signal quality parameters during operation on the ML recommended antenna system. At 655, the APM or other aspect of the wireless interface device may further determine whether the recommended antenna system meets an optimal signal quality level. For example, a preset threshold signal quality level or combination of signal quality parameters may be used to determine if the ML recommended antenna system is performing sufficiently. At block 655, an optimal signal quality may be based on RSSI, bandwidth, bit error rate, latency, congestion, drops, and signal strength, among other characteristics in QoS. Where the suggested antenna system does not meet the optimal signal quality levels or a preset threshold, the method 600 may continue at block 650 with using a different suggested antenna system, a default antenna system, or another selected antenna system. The determination that the ML recommended antenna system does not meet optimal signal quality levels or a preset threshold is fed back into the antenna selection machine learning algorithm at block 660 as training data. This training input is provided to the antenna selection machine learning algorithm indicating that the initially recommended antenna system was not optimal and the antenna selection machine learning algorithm or weighting parameters may be adjusted accordingly. Where the suggested antenna system is determined meet the optimal signal quality levels or meet a preset threshold operation, the method 600 may continue using the recommended antenna system. Flow may proceed to block 660 with providing feedback as training input to antenna selection machine learning algorithm of the antenna selection machine learning module confirming that the antenna system recommendation was optimal so as to refine the antenna selection machine learning algorithm for ML antenna recommendations including confirmation of weightings of node correlations and similar aspects. The method 600 may then end here.

Figure 7:
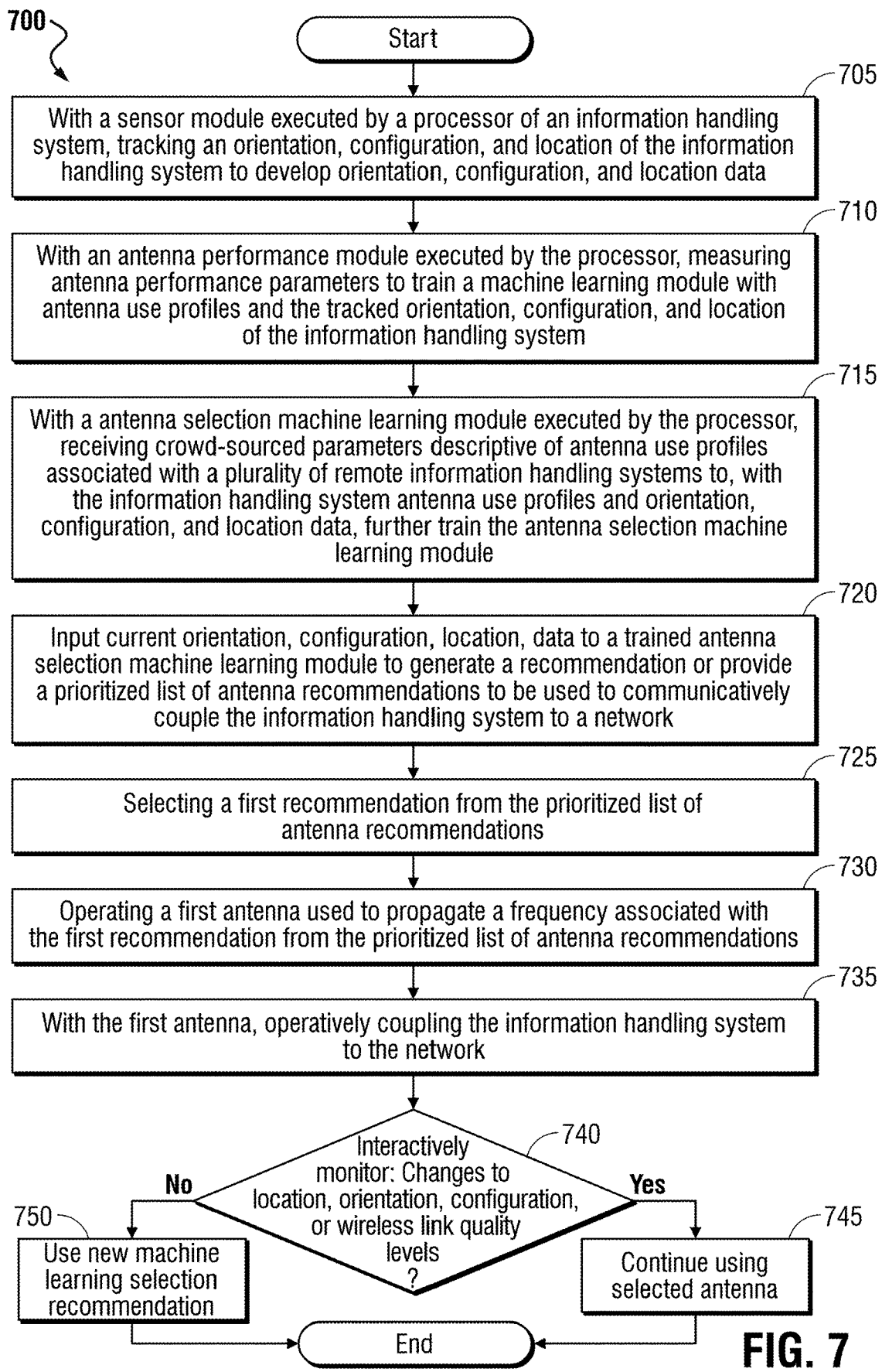
FIG. 7 is a flow diagram illustrating a method of optimizing a selection of an antenna among two or more antennas on an information handling system according to an embodiment of the present disclosure.

FIG. 7 is a flow diagram illustrating a method 700 of optimizing a selection of an antenna from plural antenna systems on an information handling system according to an embodiment of the present disclosure. The method 700 may begin at block 705 with tracking an orientation, configuration, and location of the information handling system to develop orientation, configuration, and location data using a sensor module executed by a processor of an information handling system. In some embodiments, the sensor module may receive input from any number of sensors and organize the data from that input in order to track the orientation, configuration, and location of the information handling system. These sensors may include an accelerometer, a GPS sensor, a reference sensor, a global positioning satellite (GPS) sensor, other orientation sensors, a hall effect sensor, a light (e.g., IR) sensor, a proximity sensor, a hinge sensor, a WiFi triangulation sensor, a camera, and a magnetometer sensor. Each of these sensors may provide data to the sensor module that may take one or more forms in order to describe the orientation, configuration, and location of the information handling system. For example, the accelerometer may determine whether the information handling system is moving or being oriented a certain way. Thus, in an embodiment, the accelerometer, magnetometer, or other sensor may provide data to the sensor module descriptive of the orientation of the information handling system. The GPS sensor may provide data to the sensor module descriptive of the position of the information handling system on the earth as well as the location of the information handling system relative to, for example, an access point in an embodiment. Through a variety of sensors (e.g., magnetometer, WiFi triangulation sensor, GPS sensor, among others) placed within the information handling system, the sensor module may detect the location of the information handling system within a three-dimensional space. The sensor module may accumulate this data and provide it to an antenna selection machine learning module to either train the antenna selection machine learning algorithm of the module or as input to that algorithm.

The sensor module may further use a variety of sensors to detect a configuration of the information handling system such as a tablet configuration, a dual tablet configuration, a laptop configuration, a tent mode configuration, a book configuration, as well as several other configurations described herein. These variety of sensors may include, in an embodiment, a hall effect sensor 150, a magnetometer 152, a proximity sensor 154, a hinge sensor 156, a light sensor 160, and a camera 162, among other sensors. Because the configuration or orientation of the information handling system may affect any antenna system's ability to transceive data at a specific frequency with one or more access points, at a location, the sensors may indicate what configuration or orientation that the information handling system is in. This configuration or orientation data may be provided, as described herein, to the antenna selection machine learning module to train the antenna selection machine learning algorithm and build a mathematical model (e.g., neural network model) based, in part, on the sampled data received from the sensors.

In some embodiments, the antenna use parameters may include further combinations of antenna use parameters physical surrounding indicators or application data usage indicating what types of applications are operating to determine via the antenna selection machine learning algorithm one or more optimized antenna recommendations. For example, the antenna use parameters may include one set of learned, custom antenna use parameters when physical environmental indicators indicate daytime, or working hours while a different set of learned, custom antenna use parameters may be used for evening information handling system usage. Combinations of physical surrounding indicators and application usage data indicating applications operating may adjust or change the learned, custom antenna use parameters implemented from a personal antenna use parameter in various embodiments. By way of example, where an application being executed on the information handling system does not require high bandwidth such as an email application, these learned custom antenna use parameters may impact optimal antenna recommendations. In another example, if a high-bandwidth, low latency application is being executed on the information handling system such as an internet gaming application these learned custom antenna use parameters may also impact optimal antenna recommendations.

The method 700 may proceed at block 710 with measuring antenna performance parameters to train an antenna selection machine learning module with antenna use profiles and the tracked orientation, configuration, and location of the information handling system. Again, the antenna performance module may, according to the present description, perform tasks related to measuring antenna performance parameters to use as training data inputs at a tracked orientation, configuration, and location of the information handling system. In an embodiment, the measured antenna performance parameter by the antenna performance module of the wireless interface device may be used to create the antenna use parameters developed by the antenna performance module. This training data is provided along with the sensor module data such that the measured antenna performance of any given antenna, at any given frequency, at a specific location within the information handling system while the information handling system is in a certain orientation or configuration is used to train the antenna selection machine learning algorithm. This data may be provided, as described herein, to the antenna selection ML module to train the antenna selection ML module and build a mathematical model (e.g., neural network model) based, in part, on the sampled data received from the antenna performance module.

This antenna selection machine learning algorithm model generated by the antenna selection ML module may be built through the training of the antenna selection ML module. This may be done by the antenna selection ML module detecting patterns in correlations between antenna performance parameters at specific orientations, locations, and configurations of the information handling system. The antenna selection ML module in an embodiment may determine such correlations in an embodiment based on any machine learning or neural network methodology known in the art or developed in the future. For example, the antenna selection ML module in an embodiment may model the relationships between each of the orientation of the information handling system, location of the information handling system, configuration of the information handling system, measured antenna performance parameters, and application usage data using a layered neural network topology. Such a neural network in an embodiment may include an input layer (e.g., location, orientation, configuration, antenna parameters, connection quality, bandwidth availability, and latency shown in FIG. 5) including a known, recorded set of values for each of these parameters, settings, indicators, and usage data metrics, and an output layer including a projected optimal set of values for each of the antenna use recommendations, based on the known, recorded set of values in the input layer. The antenna selection ML module in an embodiment may propagate input through the layers of the neural network to project or predict optimal antenna use parameters based on the known and recorded parameters, settings, indicators, and usage data metrics, and compare these projected values to user-selected optimal antenna use parameters. Using a back-propagation method, the antenna selection machine learning module in an embodiment may then use the difference between the projected values and the known optimal values to adjust weight matrices of the neural network describing the ways in which changes in each of the parameters, settings, indicators, and usage data metrics are likely to affect each of the optimal antenna use parameters. With the output layer, the information handling system may provide learned, custom antenna use parameters that are determined to be optimal antenna use parameters settings for the user based on the user-defined antenna use parameters if any have been designated and based upon the antenna performance parameters detected during use of the information handling system.

As described herein, some antenna systems within the information handling system may transceive frequencies in the FR1 and FR2 frequency range. These frequencies are often associated with 5G communications that allow for relatively larger amounts of data being capable of being transmitted from the information handling system. However, the ability for these frequencies to penetrate surfaces (e.g., a housing of the information handling system) and a result of the reduced effective radius of the signal as the frequency increases, the ability of some of these antenna systems to transmit the signals may be effected by these different locations, orientations, and configurations. As the location, orientation, and configuration of the information handling system is tracked by the sensor module and the antenna performance parameters are measured by the antenna performance module, the antenna selection ML module may be trained to select a specific antenna system (e.g., 5G antenna systems, sub-6 GHz antenna systems, WiFi antenna systems, among others) that would best transmit data to, for example, an access point (AP) at a location and with particular orientation and configuration of the information handling system.

In some specific embodiments, the antenna performance module may further measure antenna performance parameters of the antenna system as machine learning inputs and that describe the characteristics of the quality of service (QoS) related to the access points to which the information handling system is communicatively coupled to a network. This QoS may include any characteristics associated with a link quality between any of the antenna systems of the information handling system and the access points that have been historically detected. These characteristics in QoS include a received signal strength indicator (RSSI), bit error rate, latency, congestion, drops, bandwidth, and signal strength. In an embodiment, the information handling system may store data regarding this QoS data in the form of historic data indicating which of a specific number of access points provide the best QoS for each of the antenna systems. This QoS historic data may be stored on, for example, any storage device associated with the information handling system including a database. The method 700 may further include, with the antenna selection machine learning module executed by the processor, receiving crowd-sourced parameters descriptive of antenna use parameters associated with a plurality of remote information handling systems of similar information handling system at a location, with a similar orientation, or with a similar configuration as additional training inputs to the antenna selection machine learning module. Additional inputs to the antenna selection ML module may include crowd sourced parameters.

As described herein, these additional inputs may or may not be weighted relative to info detected on the remote information handling systems. The weighting of these additional inputs may be dependent on whether any given remote information handling system is a similar system to the information handling system, whether the remote information handling systems include similar antennas, whether the remote information handling system has similar configurations (e.g., a tablet-type information handling system or laptop-type information handling system), among other similarities or dissimilarities between the remote information handling systems and the information handling system. In an embodiment, the closer the features of the remote information handling system are to the information handling system, the more weight is applied to the additional inputs provided by the crowd sourced and remote information handling systems.

Again, the remote information handling systems include an antenna selection machine learning module, sensor module, and antenna performance module used to also create, at least, machine learning training data to be consumed by the antenna selection machine learning module. As the data points from the machine learning training data originating from the information handling system and remote handling systems increases, the amount of data used to train the antenna selection machine learning module of the information handling system is also increased thereby increasing the accuracy of the recommendations provided on the prioritized list of antenna recommendations.

At block 720, the method 700 may continue with inputting a current orientation, configuration, and location data to a trained antenna selection machine learning module to generate a recommendation or provide a prioritized list of antenna recommendations to be used to communicatively couple the information handling system to a network. For example, the antenna selection machine learning module applies a trained machine learning algorithm methodology to develop an antenna recommendation. In some embodiments, the information handling system may detect changes to any of these influencing factors or the antenna performance parameters, and notify the antenna selection machine learning module to suggest an antenna selection recommendation. The antenna selection machine learning module may respond by either suggesting or automatically applying changes to one or more of the factors controlling a determination of the antenna recommendations. For example, the sensor module (142 of FIG. 1) and antenna performance module (e.g., 164 of FIG. 1), in an embodiment, may continuously monitor incoming sensed changes in orientation, location, configuration and notify the antenna selection machine learning module that then determines when one of these factors warrants a change to the recommendation resulting from a previous application of input parameters to the trained antenna selection machine learning module. The recommendation custom antenna use profiles may be compared for various antennas on the information handling system to determine one or more recommended antennas for wireless communications. The recommendation may include the learned aspects based on the input parameters that results from application of the trained antenna selection machine learning algorithm in embodiments herein.

The method 700 also includes, at block 725, selecting a first recommendation from a prioritized list of antenna recommendations. This recommendation is used by a user to select or, alternatively, the antenna selection ML module to automatically select an antenna system included within the information handling system. The antenna systems included within the information handling system may be any type of antenna system that operatively couples the information handling system to a network such as those described with respect to the examples of FIG. 1, FIGS. 4A and 4B above. In a specific embodiment, the antenna systems within the information handling system may include one or more of a mm-wave 60 GHz antenna, a mm-wave 37 GHz antenna, a mm-wave 28 GHz antenna, a 5G sub-6 GHz antenna, a 4G antenna, a WiFi antenna, among others. The method 700 may continue with operating a first antenna system used to propagate a frequency associated with the first antenna selection machine learning recommendation, such as from a prioritized list of antenna system recommendations, at block 730 so long as an orientation, location, and configuration of the information handling system or antenna use parameters have not changed. Then the information handling system is operatively coupled to a network at block 735 using the first antenna system that was the ML recommendation by activating the wireless interface device associated with the selected antenna system to establish a wireless link with a corresponding access point for wireless communications.

At block 740, the method 700 also includes iteratively monitoring changes to the information handling system location, orientation, or configuration or network wireless link quality executing the antenna selection machine learning module again to get recommendations as to whether to change the antenna system used and, if so, which antenna system to automatically switch to. The antenna performance module of example embodiments may operate on one or more wireless interface devices to monitor wireless signal quality parameters while a recommended antenna system operates to transcieve wireless communications. Further, orientation sensors, configuration sensors, or location sensors of a sensor module as well as changes to operating applications and physical environment factors may be iteratively or continuously monitored as well at block 740. Where changes to the location, orientation, configuration, or wireless link quality level are detected at block 740, the method 700 may proceed at block 750 with using a new machine learning antenna selection recommendation from the antenna selection ML module in some embodiments as described. Use of any antenna system may be monitored as well as orientation, configuration and location data during operation at 740. The determination to change antenna system recommendations may be fed back into the antenna selection machine learning algorithm at as training data provided to the antenna selection machine learning algorithm indicating that the initially recommended antenna system was not optimal such as in the case that signal quality degrades during usage. Where changes to the location, orientation, configuration, or wireless link quality level are not detected at block 740, the method 700 may include continuing to use the selected antenna system at block 745. As before, use of this ML recommended antenna system may be iteratively continuously monitored as well as for changes in orientation, configuration, and location of the information handling system. Again, the method 700 may include providing feedback as training input to antenna selection machine learning algorithm of the antenna selection machine learning module of ongoing use of the recommended antenna system indicating that the selected antenna system recommendation was optimal so as to refine the antenna recommendations. In some embodiments, at some point the system may power down or use of wireless systems may cease. The method 700 may then end here.

Again, the developed machine learning training data from the information handling system and remote information handling systems will be used to develop the prioritized list of antenna recommendations again. Alternatively, or additionally, any originally developed prioritized list of antenna recommendations may be leveraged to automatically determine which, if any, antenna system should be used in lieu of the use of other antenna systems.

The blocks of the flow diagrams of FIGS. 6 and 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of optimizing a selection of an antenna on an information handling system, the method comprising:

executing a sensor module via a processor of the information handling system, the sensor module to receive data from a plurality of sensors for tracking orientations, configurations, and locations of the information handling system;

executing an antenna performance tracking system of at least one wireless interface device, the wireless interface device measuring antenna performance parameters including received signal strength indicator (RSSI), latency, and bandwidth at a plurality of locations;

training an antenna selection machine learning algorithm of an antenna selection machine learning module with training inputs of the orientations, the configurations, and the antenna performance parameters for the plurality of locations to determine an antenna system recommendation;

executing the trained antenna selection machine learning module with operating inputs for an operating orientation and an operating configuration at an operation location to determine a recommended antenna system for use in a wireless communication from a plurality of available antenna systems deployed on the information handling system; and selecting the recommended antenna system and operating a first antenna of the recommended antenna system to establish a first wireless link via the wireless interface device for wireless communications.

2. The method of claim 1, further comprising:
receiving crowd-sourced parameters descriptive of antenna use profiles associated with a plurality of remote information handling systems indicating the antenna performance parameters, the orientations, and the configurations, at the plurality of locations as the training inputs to the antenna selection machine learning algorithm of the antenna selection machine learning module.

3. The method of claim 1, wherein executing the trained antenna selection machine learning module with the operating inputs for the operating orientation and the operating configuration at the operation location determines a plurality of recommended antenna systems in a prioritized list from the plurality of available antenna systems for use in the wireless communication.

4. The method of claim 3, further comprising:
determining that the first antenna of the recommended antenna system does not meet a threshold of the antenna performance parameters; and
selecting a second recommended antenna system on a prioritized list and operating a second antenna of the second recommended antenna system to establish a second wireless link via the wireless interface device for the wireless communications.

5. The method of claim 1, further comprising:
determining that the first antenna of the recommended antenna system does not meet a threshold of antenna performance parameters;
executing the trained antenna selection machine learning module with the operating inputs for the operating orientation and the operating configuration at the operation location to determine a second recommended antenna system from the plurality of available antenna systems; and
selecting the second recommended antenna system and operating a second antenna of the second recommended antenna system to establish a second wireless link via the wireless interface device for the wireless communications.

6. The method of claim 1, further comprising:
determining a change in the operation location of the information handling system is beyond a threshold level to a second operation location;
executing the trained antenna selection machine learning module with the operating inputs for the operating orientation and the operating configuration at the second operation location to determine a second recommended antenna system from the plurality of available antenna systems; and
selecting the second recommended antenna system and operating a second antenna of the second recommended antenna system to establish a second wireless link via the wireless interface device for the wireless communications.

7. The method of claim 1, further comprising:
determining that a configuration of the information handling system is changed beyond a threshold level to a second configuration;
executing the trained antenna selection machine learning module with the operating inputs for a second orientation and the second configuration at the operation location to determine a second recommended antenna system from the plurality of available antenna systems; and selecting the second recommended antenna system and operating a second antenna of the second recommended antenna system to establish a second wireless link via the wireless interface device for the wireless communications.

8. The information handling system of claim 1, wherein the training inputs received at the antenna selection machine learning module to train the antenna selection machine learning algorithm further include indications of applications operating on the information handling system for data usage information at the operation location.

9. An information handling system to optimize a selection of an antenna system, the information handling system comprising:
a processor;
a data storage device;
a power management unit;
an orientation and configuration sensor module operatively coupled to a plurality of orientation and configuration sensors, the orientation and configuration sensors including a location sensor, an accelerometer, and a magnetometer to detect orientations and configurations of the information handling system at a plurality of locations;
an antenna performance tracking system of at least one wireless interface device, the wireless interface device measuring antenna performance parameters including received signal strength indicator (RSSI), latency, and bandwidth at the plurality of locations with the detected orientations and configurations of the information handling system;
an antenna selection machine learning module, executed by the processor, the antenna selection machine learning module to receive sensor data of the detected orientations and configurations, and the antenna performance parameters and receive crowd-sourced parameters descriptive of the orientations, the configurations, and the antenna performance parameters associated with a plurality of remote information handling systems as training inputs to train an antenna selection machine learning algorithm of the antenna selection machine learning module;
a trained antenna selection machine learning module to receive operating inputs for an operating orientation and an operating configuration at an operation location to determine a recommended antenna system for use in a wireless communication from a plurality of available antenna systems deployed on the information handling system; and
the processor to select the recommended antenna system and operate a first antenna of the recommended antenna system to establish a first wireless link via the wireless interface device for wireless communications.

10. The information handling system of claim 9, further comprising:
the wireless interface device to determine that the first antenna of the recommended antenna system does not meet a threshold of the antenna performance parameters; and
the processor providing a feedback as training input to the antenna selection machine learning module that the recommended antenna system does not meet the threshold of the antenna performance parameters to adjust the antenna selection machine learning algorithm.

11. The information handling system of claim 9, further comprising:
the wireless interface device to determine that the first antenna of the recommended antenna system does meet a threshold of the antenna performance parameters; and
the processor to provide a feedback as training input to the antenna selection machine learning module that the recommended antenna system did meet the threshold of the antenna performance parameters to confirm the antenna selection machine learning algorithm.

12. The information handling system of claim 10, wherein the trained antenna selection machine learning module receives the operating inputs for the operating orientation and the operating configuration at the operation location to determine a second recommended antenna system from the plurality of available antenna systems for use in wireless communication.

13. The information handling system of claim 9, wherein the training inputs received at the antenna selection machine learning module to train the antenna selection machine learning algorithm further include indications of applications operating on the information handling system for data usage information at the operation location.

14. The information handling system of claim 9, wherein the training inputs received at the antenna selection machine learning module to train the antenna selection machine learning algorithm further include indications of physical environment indicators of the information handling system from ambient sensors or a clock for data usage information at the operation location.

15. The information handling system of claim 9, wherein executing the trained antenna selection machine learning module with the operating inputs for the operating orientation and the operating configuration at the operation location determines a plurality of recommended antenna systems in a prioritized list from the plurality of available antenna systems for use in the wireless communication.

16. A method of optimizing a selection of an antenna on an information handling system, the method comprising:
executing a sensor module via a processor of the information handling system, the sensor module to receive data from a plurality of sensors for tracking orientations, configurations, and locations of the information handling system;
executing a trained antenna selection machine learning module with operating inputs for an operating orientation and an operating configuration at an operation location to correlate wireless link performance parameters, including received signal strength indicator (RSSI), latency, and bandwidth, for a plurality of available antenna systems deployed on the information handling system with the operating orientation and the operating configuration at the operation location to determine a recommended antenna system from the plurality of available antenna systems for use in a wireless communication; and
selecting the recommended antenna system and operating a first antenna of the recommended antenna system to establish a first wireless link via a wireless interface device for wireless communications.

17. The method of claim 16, wherein executing the trained antenna selection machine learning module with the operating inputs for the operating orientation and the operating configuration at the operation location determines a plurality of recommended antenna systems in a prioritized list from the available antenna systems for use in the wireless communication.

18. The method of claim 17, further comprising:
determining that the first antenna of the recommended antenna system does not meet a threshold of the antenna performance parameters; and
selecting a second recommended antenna system on the prioritized list and operating a second antenna of the second recommended antenna system to establish a second wireless link via the wireless interface device for the wireless communications.

19. The method of claim 16, further comprising:
determining that the first antenna of the recommended antenna system does not meet a threshold of the antenna performance parameters;
executing the trained antenna selection machine learning module with the operating inputs for the operating orientation and the operating configuration at the operation location to determine a second recommended antenna system from the plurality of available antenna systems; and
selecting the second recommended antenna system and operating a second antenna of the second recommended antenna system to establish a second wireless link via the wireless interface device for the wireless communications.

20. The method of claim 16, further comprising:
determining a change in the operation location of the information handling system beyond a threshold level to a second operation location;
executing the trained antenna selection machine learning module with the operating inputs for the operating orientation and the operating configuration at the second operation location to determine a second recommended antenna system from the plurality of available antenna systems; and
selecting the second recommended antenna system and operating a second antenna of the second recommended antenna system to establish a second wireless link via the wireless interface device for the wireless communications.

* * * * *